(12) United States Patent
Daley, III

(10) Patent No.: US 8,467,176 B2
(45) Date of Patent: *Jun. 18, 2013

(54) BAG COMPUTER SYSTEM AND BAG APPARATUS

(76) Inventor: Charles A. Daley, III, Rawai (TH)

( * ) Notice: Subject to any disclaimer, the term of this patent is extended or adjusted under 35 U.S.C. 154(b) by 50 days.

This patent is subject to a terminal disclaimer.

(21) Appl. No.: 13/137,467

(22) Filed: Aug. 18, 2011

(65) Prior Publication Data

US 2011/0304970 A1    Dec. 15, 2011

Related U.S. Application Data

(63) Continuation of application No. 12/925,953, filed on Nov. 4, 2010, now Pat. No. 8,194,398, which is a continuation of application No. 12/216,650, filed on Jul. 9, 2008, now Pat. No. 7,881,048, which is a continuation-in-part of application No. 11/796,920, filed on May 1, 2007, now abandoned, which is a continuation-in-part of application No. 11/799,011, filed on May 1, 2007, now abandoned.

(51) Int. Cl.
*G06F 1/16* (2006.01)

(52) U.S. Cl.
USPC .................................................. 361/679.03

(58) Field of Classification Search
None
See application file for complete search history.

(56) References Cited

U.S. PATENT DOCUMENTS

| | | | | |
|---|---|---|---|---|
| 5,217,119 A | * | 6/1993 | Hollingsworth | 206/583 |
| 5,222,642 A | * | 6/1993 | Solarz | 224/191 |
| 5,445,266 A | * | 8/1995 | Prete et al. | 206/320 |
| 5,494,157 A | * | 2/1996 | Golenz et al. | 206/320 |
| 5,678,666 A | * | 10/1997 | Shyr et al. | 190/102 |
| 5,774,338 A | * | 6/1998 | Wessling, III | 361/730 |
| 5,887,723 A | * | 3/1999 | Myles et al. | 206/760 |
| 5,887,777 A | * | 3/1999 | Myles et al. | 224/578 |
| 5,908,147 A | * | 6/1999 | Chuang | 224/607 |
| 6,105,764 A | * | 8/2000 | Scicluna et al. | 206/320 |
| 6,161,738 A | * | 12/2000 | Norris | 224/153 |
| 6,283,299 B1 | * | 9/2001 | Lee | 206/760 |
| 6,393,745 B1 | * | 5/2002 | Miki | 40/586 |
| 6,597,568 B2 | * | 7/2003 | Ryder | 361/679.55 |
| 6,685,016 B2 | * | 2/2004 | Swaim et al. | 206/320 |
| 6,763,942 B1 | * | 7/2004 | Yeh | 206/320 |
| 6,769,588 B2 | * | 8/2004 | Zheng | 224/576 |
| 6,956,614 B1 | * | 10/2005 | Quintana et al. | 348/373 |
| 6,962,277 B2 | * | 11/2005 | Quintana et al. | 224/262 |
| 7,265,970 B2 | * | 9/2007 | Jordan | 361/679.27 |
| 7,821,779 B2 | * | 10/2010 | Daley, III | 361/679.02 |
| 7,876,558 B2 | * | 1/2011 | Daley, III | 361/679.55 |

(Continued)

FOREIGN PATENT DOCUMENTS

JP   2004097801 A * 4/2004

*Primary Examiner* — Lisa Lea Edmonds

(57) ABSTRACT

Disclosed is a system comprised of a bag and computer combination which allows the bag wearer to quickly access and use a computer while mobile. The system can be in three forms and all three are used in the same way: a pivoting cover is moved out of the way to expose a display which pivots into the line of sight of the wearer/operator. When assembled, all the components are physically connected and electrical components are electrically connected. Additional components include a keyboard or write pad mounted on the pivoting cover or on a separate pivoting mount near the center bag front, a display prop which braces the display in various angular positions and side pockets fitted for peripherals. An example is cited using a bag with flap mounts and equipment which mounts to the flaps using clamps.

73 Claims, 27 Drawing Sheets

U.S. PATENT DOCUMENTS

| | | | | |
|---|---|---|---|---|
| 7,881,048 B2* | 2/2011 | Daley, III | | 361/679.03 |
| 7,889,496 B2* | 2/2011 | Daley, III | | 361/679.55 |
| 7,894,179 B2* | 2/2011 | Daley, III | | 361/679.03 |
| 7,974,081 B2* | 7/2011 | Daley, III | | 361/679.03 |
| 7,978,464 B2* | 7/2011 | Daley, III | | 361/679.02 |
| 8,014,138 B2* | 9/2011 | Daley, III | | 361/679.03 |
| 8,094,440 B2* | 1/2012 | Daley, III | | 361/679.03 |
| 8,125,770 B2* | 2/2012 | Daley, III | | 361/679.03 |
| 8,194,398 B2* | 6/2012 | Daley, III | | 361/679.03 |
| 2004/0134813 A1* | 7/2004 | Domotor | | 206/320 |
| 2005/0000843 A1* | 1/2005 | Zheng | | 206/457 |
| 2005/0011920 A1* | 1/2005 | Feng | | 224/275 |
| 2005/0045673 A1* | 3/2005 | Godshaw et al. | | 224/153 |
| 2005/0103815 A1* | 5/2005 | Lee et al. | | 224/275 |
| 2006/0042996 A1* | 3/2006 | Picot et al. | | 206/586 |
| 2006/0113203 A1* | 6/2006 | Daley | | 206/320 |
| 2006/0113213 A1* | 6/2006 | Daley, III | | 206/576 |
| 2006/0144663 A1* | 7/2006 | Gullen et al. | | 190/110 |
| 2006/0163303 A1* | 7/2006 | Trutanich | | 224/576 |
| 2007/0151881 A1* | 7/2007 | Zheng | | 206/320 |
| 2007/0199844 A1* | 8/2007 | Daley, III | | 206/320 |
| 2007/0199851 A1* | 8/2007 | Yau | | 206/472 |
| 2007/0201201 A1* | 8/2007 | Daley, III | | 361/683 |
| 2008/0161753 A1* | 7/2008 | Gillespie et al. | | 604/65 |
| 2008/0192421 A1* | 8/2008 | Daley | | 361/681 |
| 2008/0237250 A1* | 10/2008 | Swansey | | 220/756 |
| 2008/0273298 A1* | 11/2008 | Daley | | 361/683 |
| 2008/0289886 A1* | 11/2008 | Burkitt | | 178/18.03 |
| 2009/0009476 A1* | 1/2009 | Daley, III | | 345/168 |
| 2009/0009938 A1* | 1/2009 | Daley, III | | 361/680 |
| 2009/0027632 A1* | 1/2009 | Choi | | 353/98 |
| 2009/0046416 A1* | 2/2009 | Daley, III | | 361/679.55 |
| 2009/0107877 A1* | 4/2009 | Daley, III | | 206/576 |
| 2009/0107878 A1* | 4/2009 | Daley, III | | 206/576 |
| 2009/0141446 A1* | 6/2009 | Daley, III | | 361/679.55 |
| 2009/0185342 A1* | 7/2009 | Daley, III | | 361/679.27 |
| 2009/0190296 A1* | 7/2009 | Daley, III | | 361/679.27 |
| 2009/0201637 A1* | 8/2009 | Daley, III | | 361/679.29 |
| 2009/0225508 A1* | 9/2009 | Daley, III | | 361/679.27 |
| 2009/0225509 A1* | 9/2009 | Daley, III | | 361/679.29 |
| 2009/0236247 A1* | 9/2009 | Daley, III | | 206/320 |
| 2009/0284908 A1* | 11/2009 | Daley, III | | 361/679.17 |
| 2010/0050485 A1* | 3/2010 | Forte et al. | | 40/1.5 |
| 2010/0193384 A1* | 8/2010 | Daley, III | | 206/320 |
| 2010/0219221 A1* | 9/2010 | Zheng | | 224/576 |
| 2010/0220434 A1* | 9/2010 | Daley, III | | 361/679.27 |
| 2010/0256561 A1* | 10/2010 | Gillespie et al. | | 604/151 |
| 2011/0032669 A1* | 2/2011 | Daley, III | | 361/679.03 |
| 2011/0051349 A1* | 3/2011 | Daley, III | | 361/679.27 |
| 2011/0051362 A1* | 3/2011 | Daley, III | | 361/679.55 |
| 2011/0102992 A1* | 5/2011 | Daley, III | | 361/679.03 |
| 2011/0164366 A1* | 7/2011 | Daley, III | | 361/679.03 |
| 2011/0267754 A1* | 11/2011 | Daley, III | | 361/679.03 |
| 2011/0304965 A1* | 12/2011 | Daley, III | | 361/679.03 |
| 2012/0008261 A1* | 1/2012 | Daley, III | | 361/679.01 |
| 2012/0106055 A1* | 5/2012 | Daley, III | | 361/679.03 |
| 2012/0275102 A1* | 11/2012 | Daley, III | | 361/679.03 |

* cited by examiner

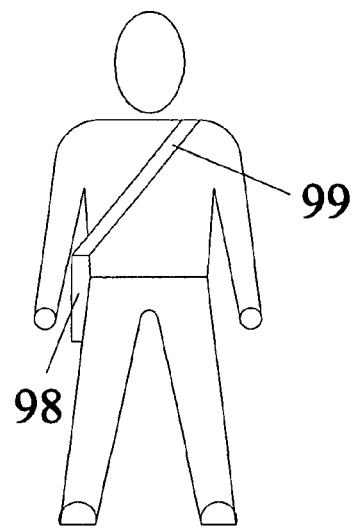
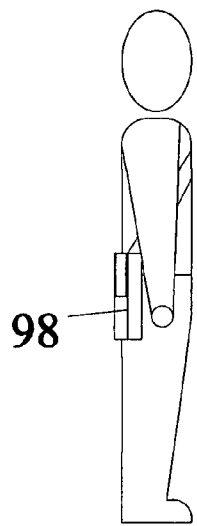
FIG. 1A  FIG. 1B
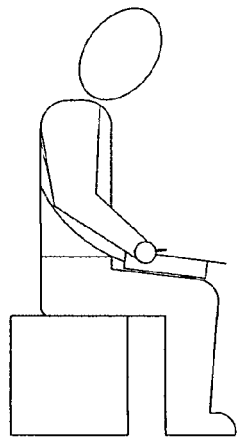
FIG. 4
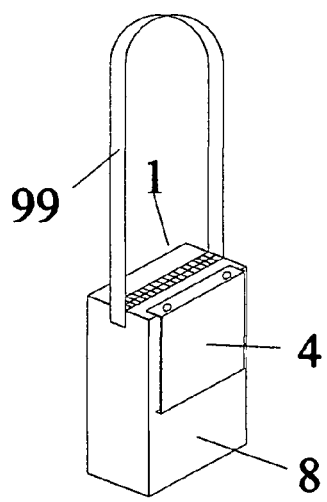
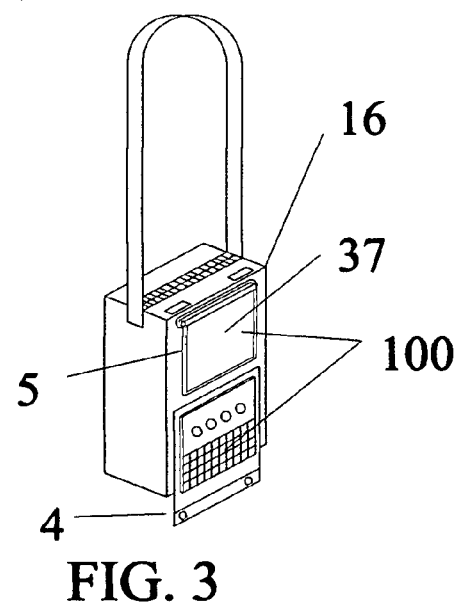
FIG. 2  FIG. 3

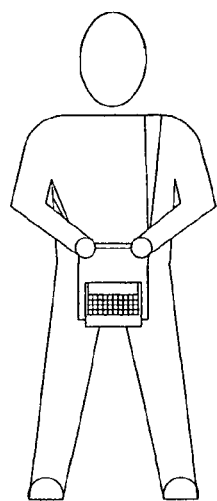
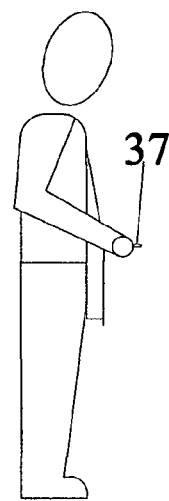
FIG. 5A  FIG. 5B
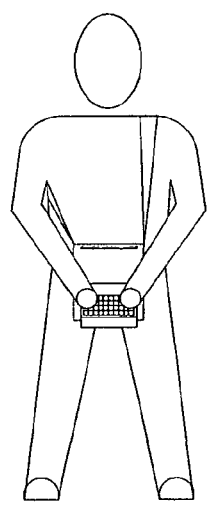
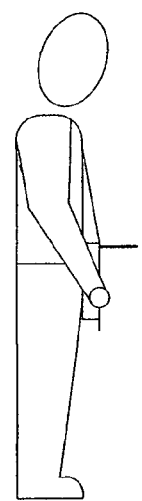
FIG. 6A  FIG. 6B
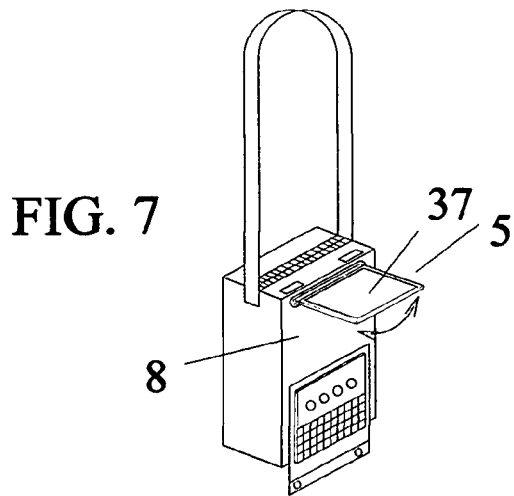
FIG. 7

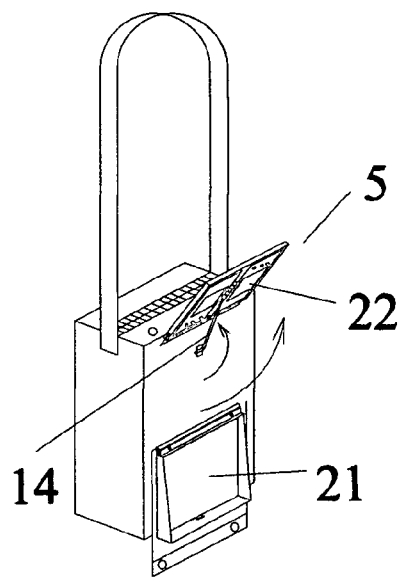
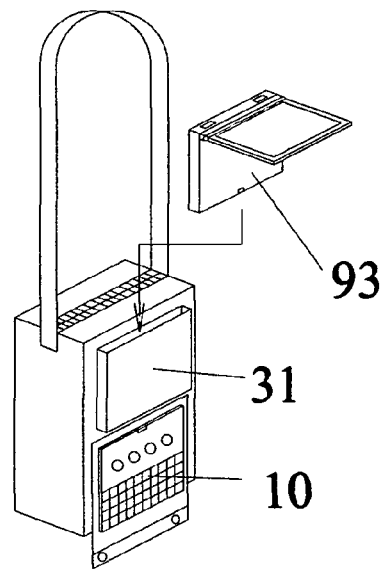
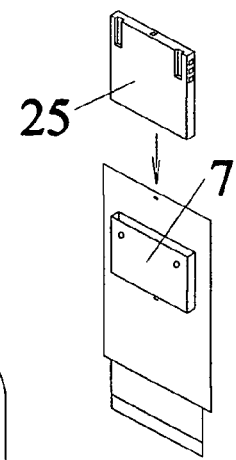
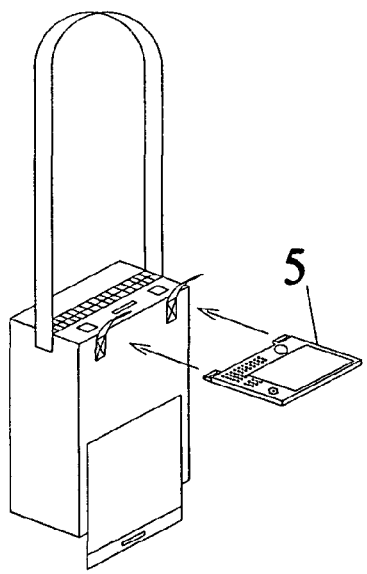
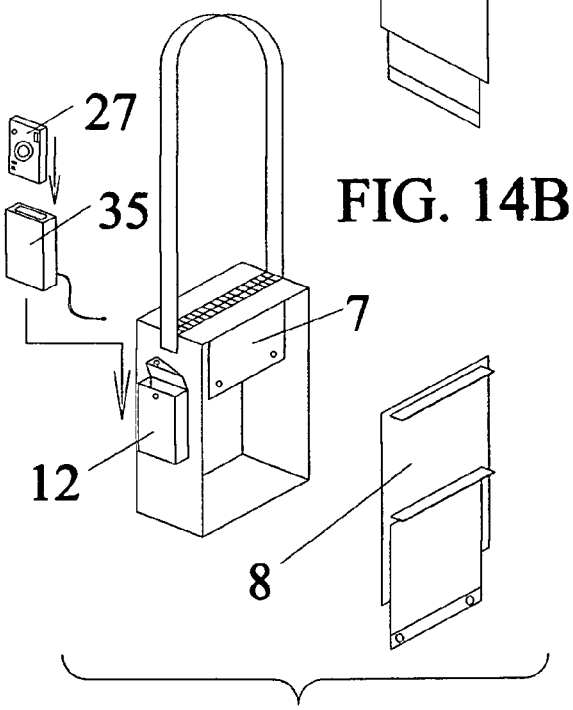
FIG.11    FIG. 12    FIG. 14B
FIG.13    FIG. 14A

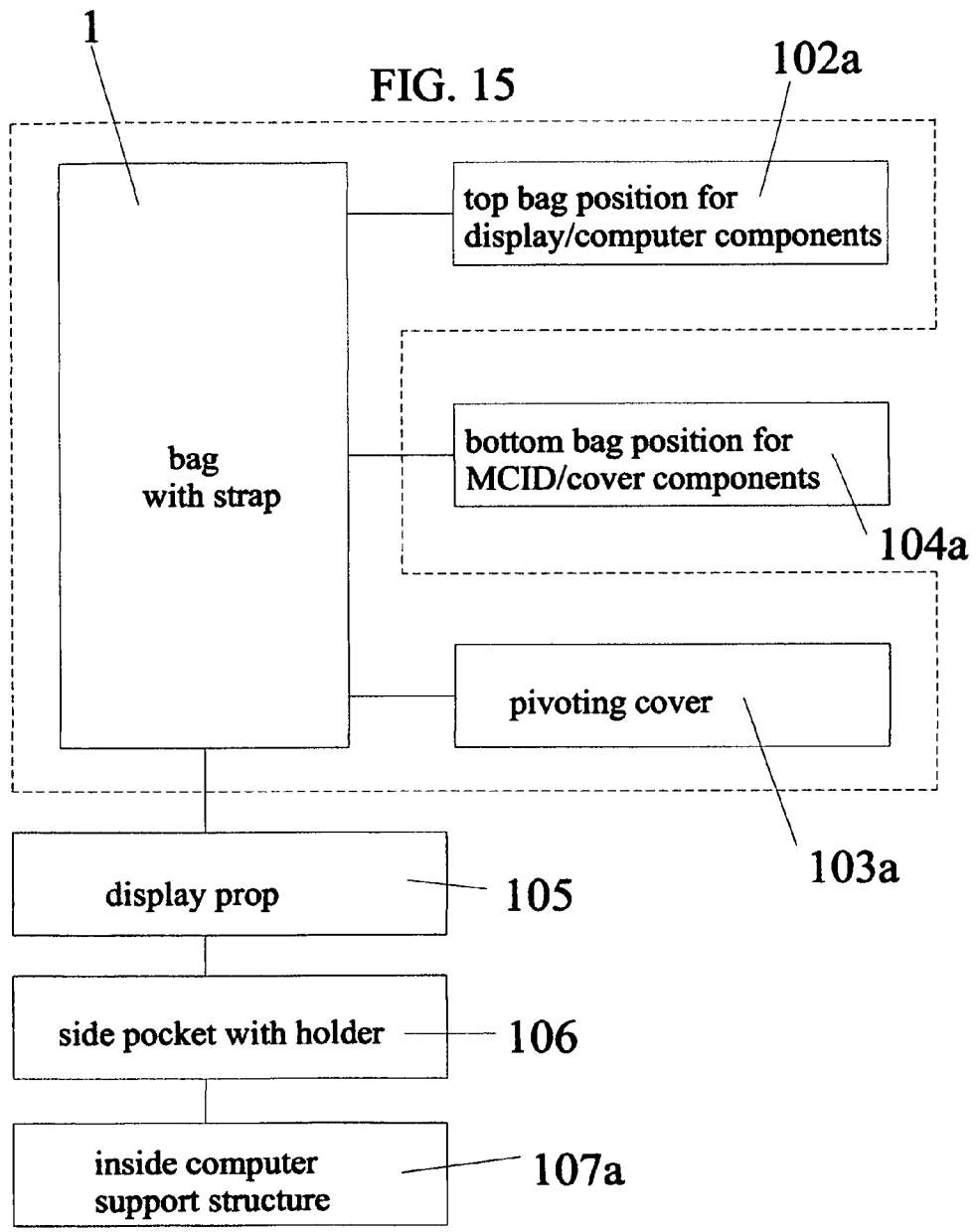

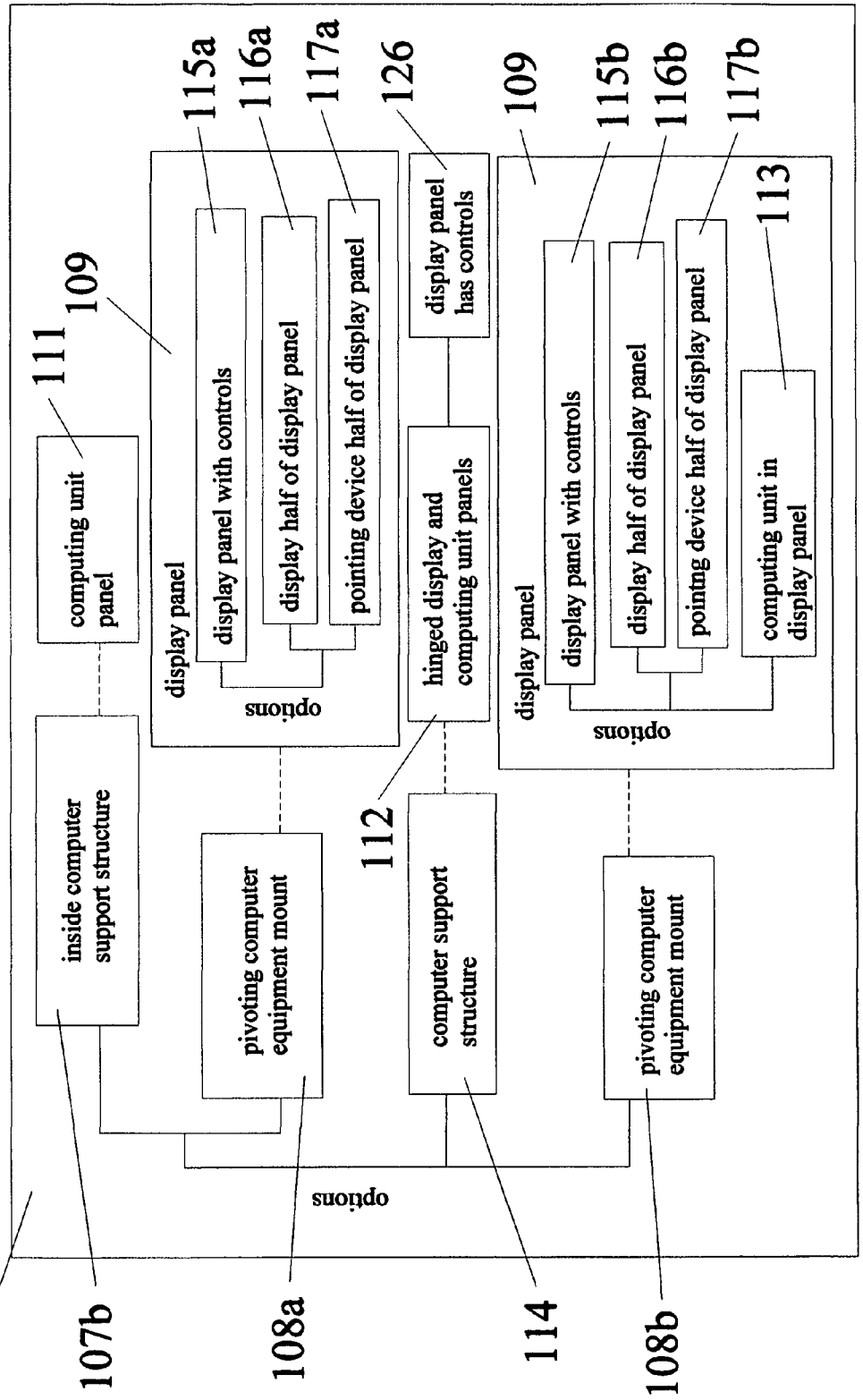
FIG. 16 top bag position for display/computer components

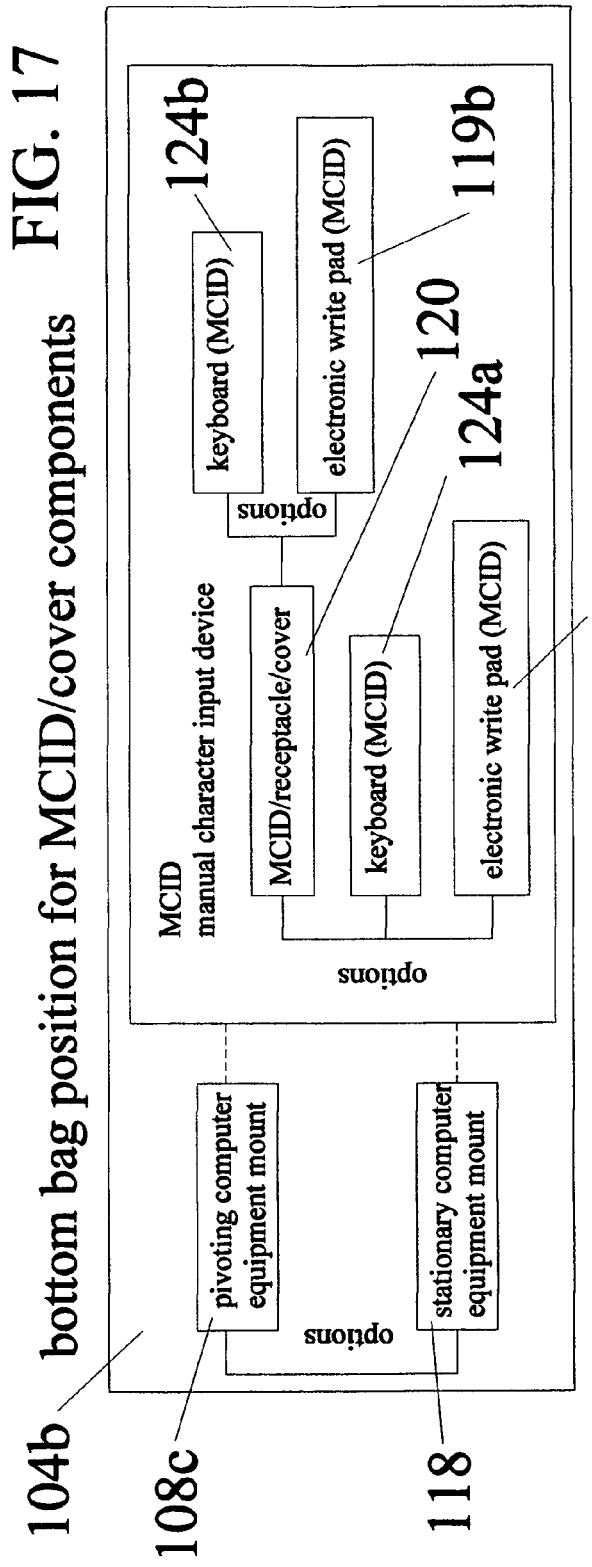
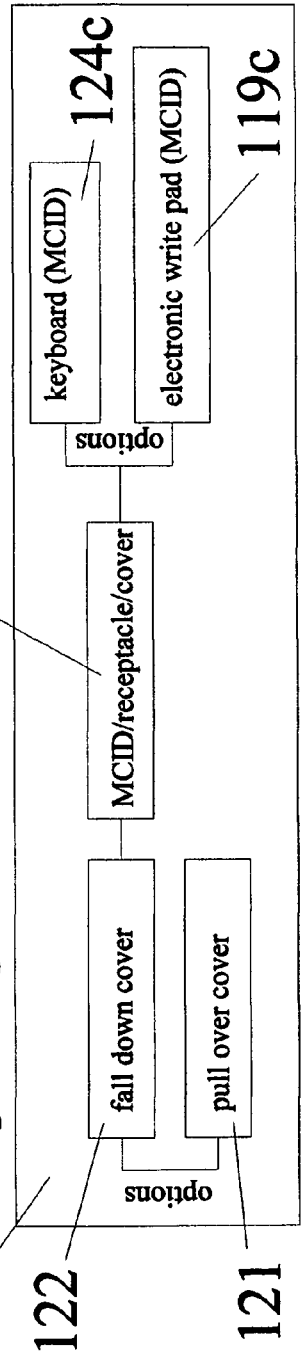

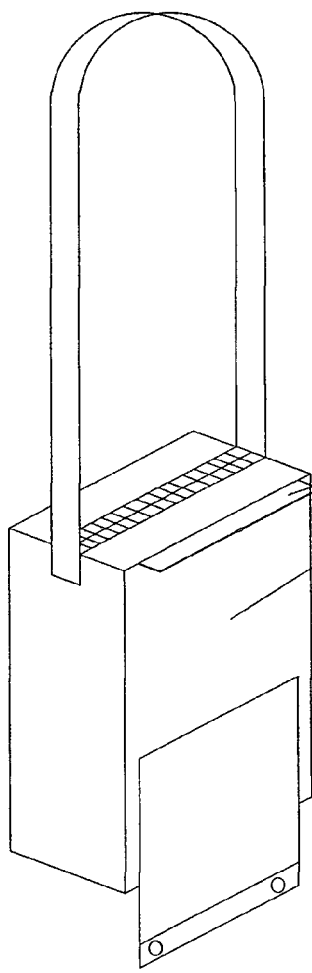
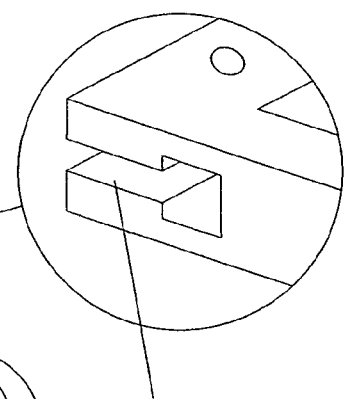
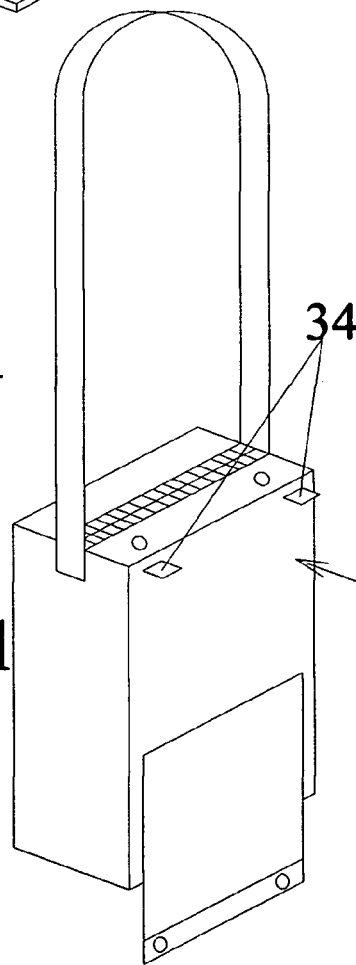
FIG. 20B
FIG. 20A
FIG. 21

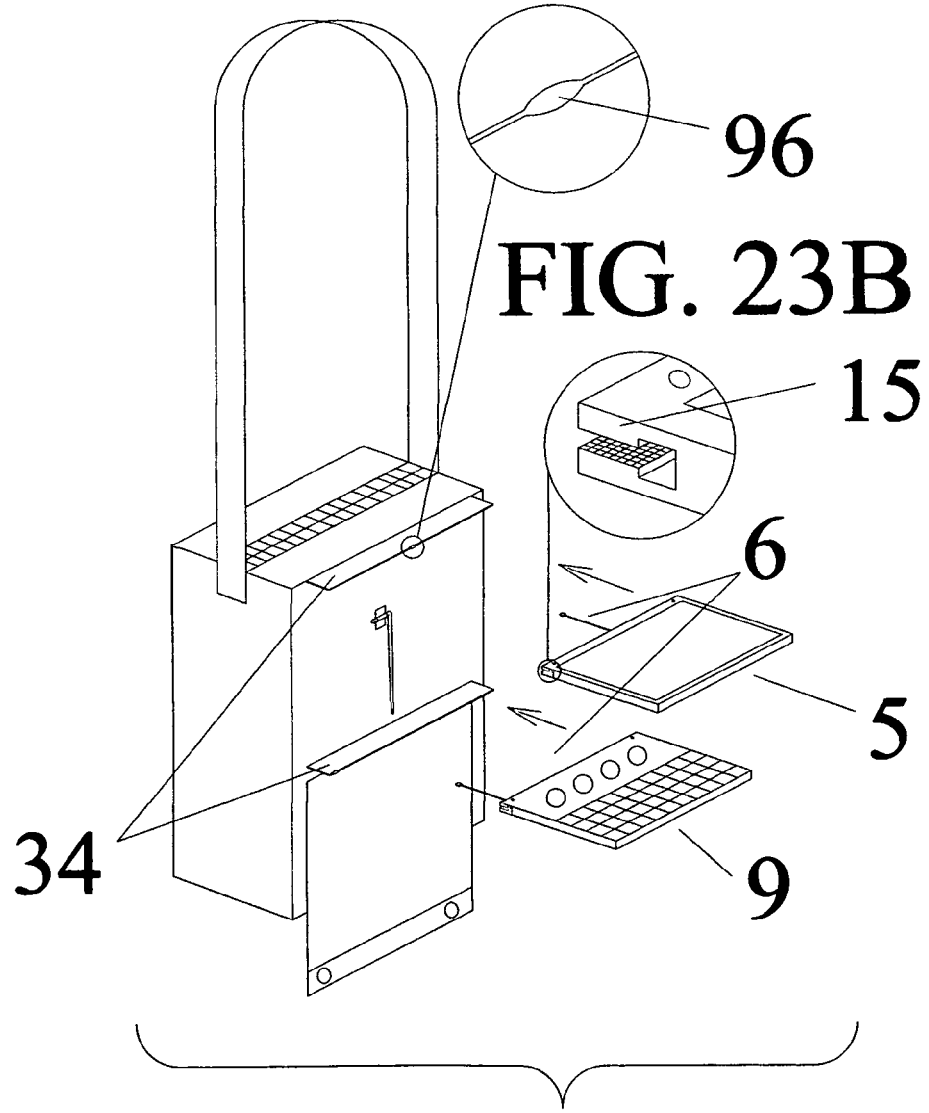

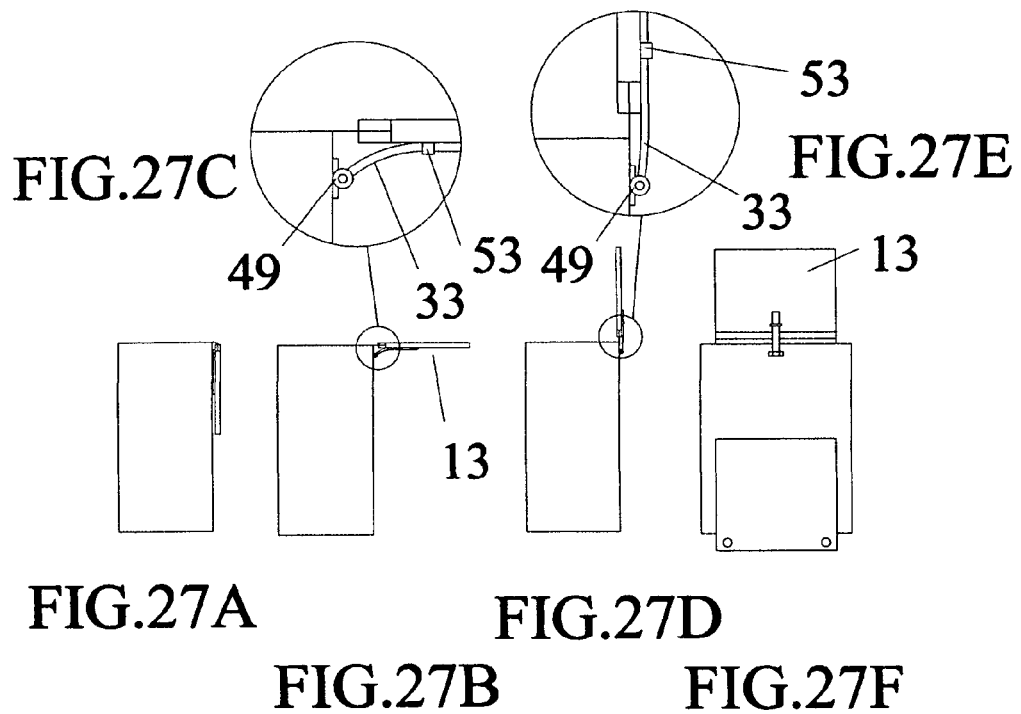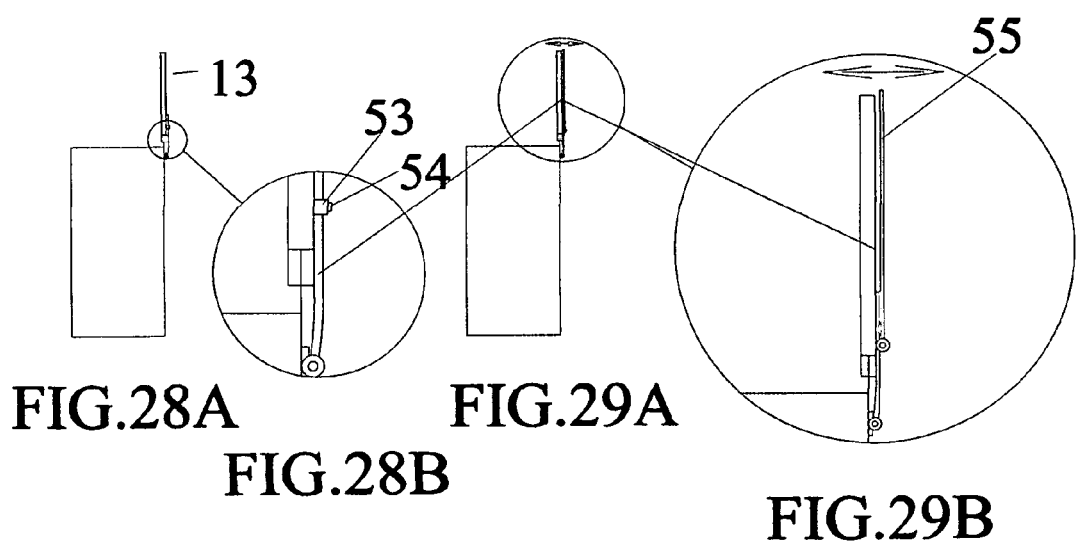

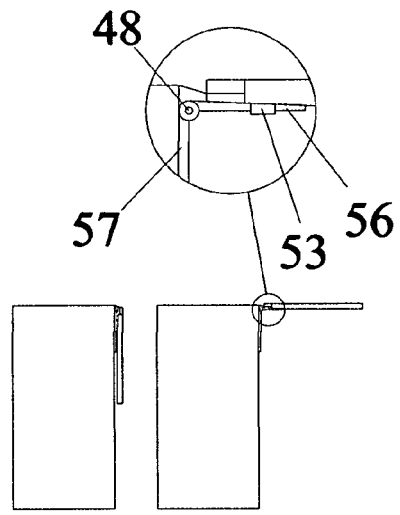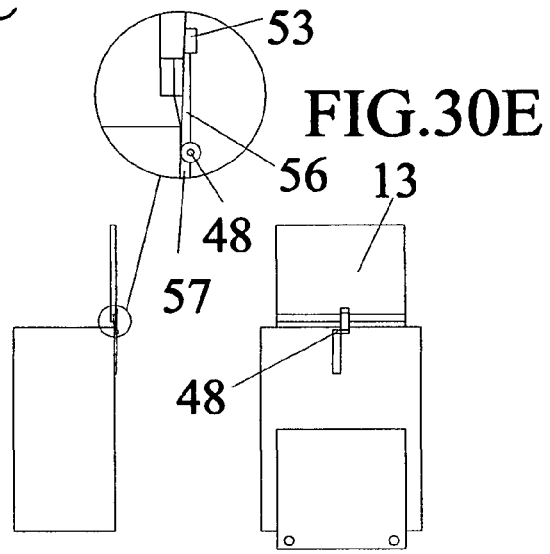
FIG.30A   FIG.30D   FIG.30F
FIG.30B
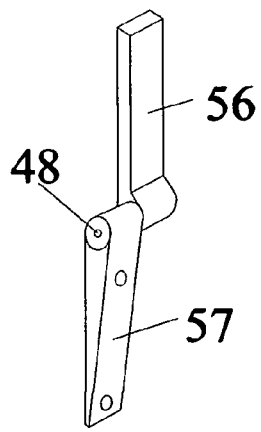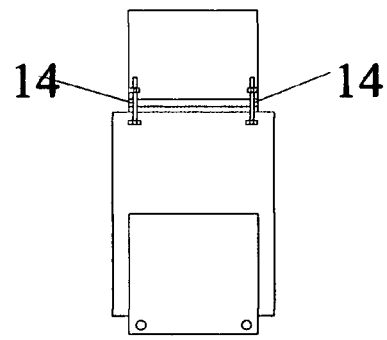
FIG.31   FIG.32

FIG. 33A
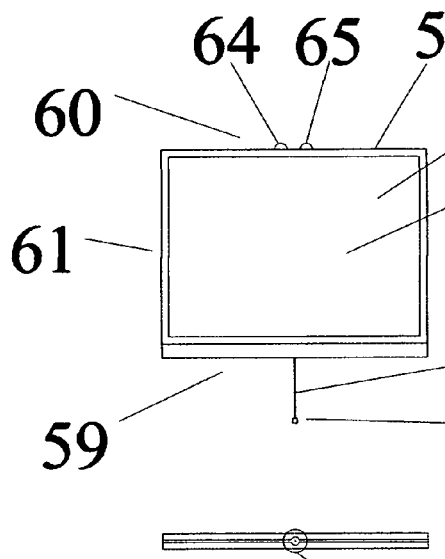
FIG. 33B
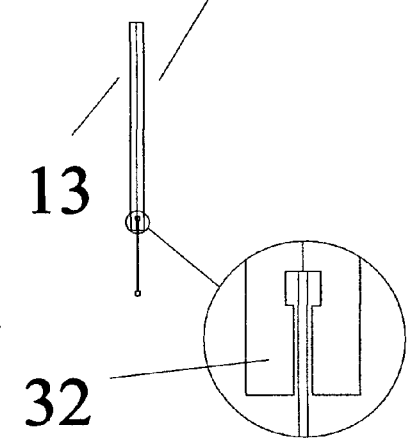
FIG. 33C
FIG. 33E
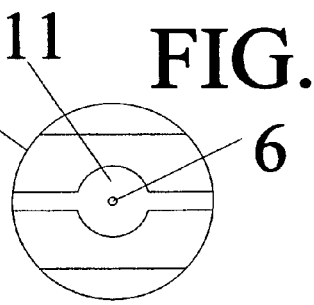
FIG. 33D
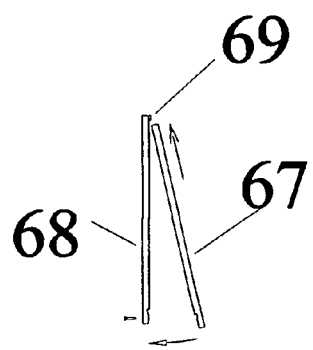
FIG. 33F

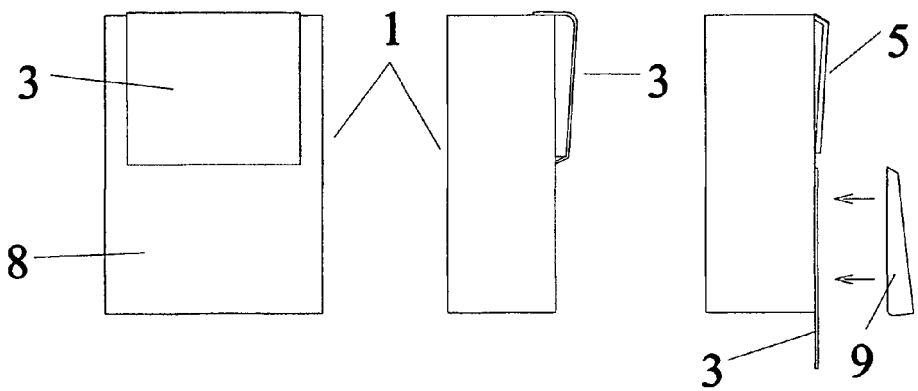
FIG. 42A  FIG. 42B  FIG. 42C
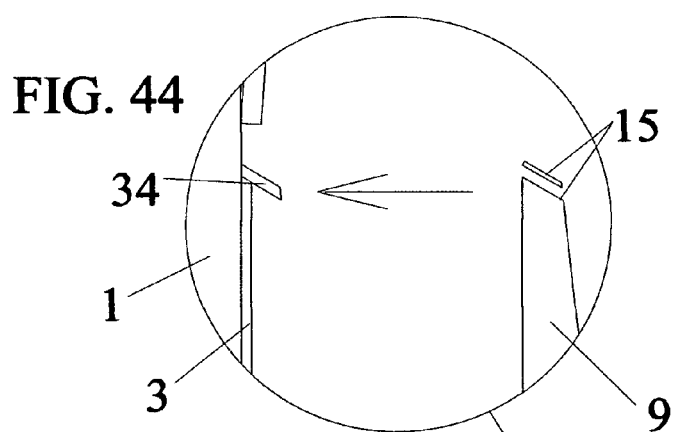
FIG. 44
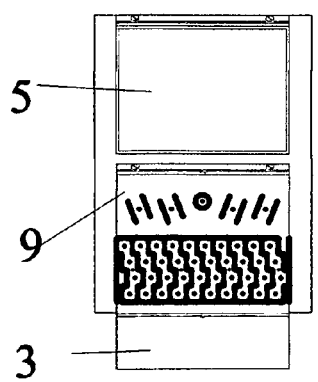 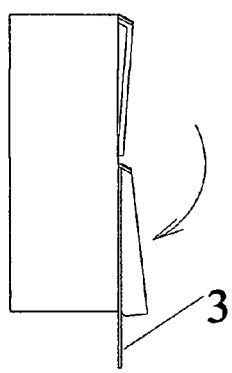 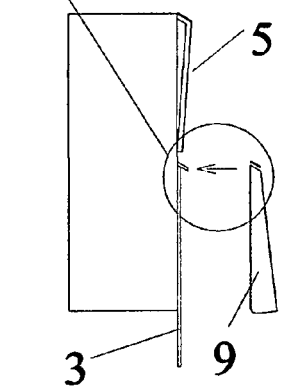
FIG. 43A  FIG. 43B  FIG. 43C

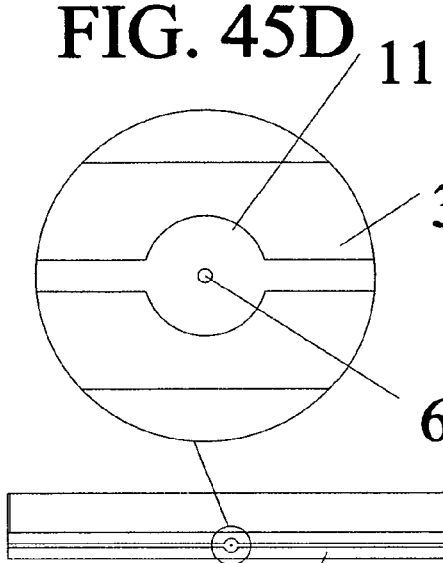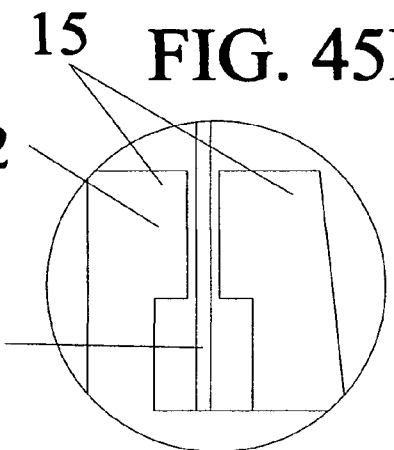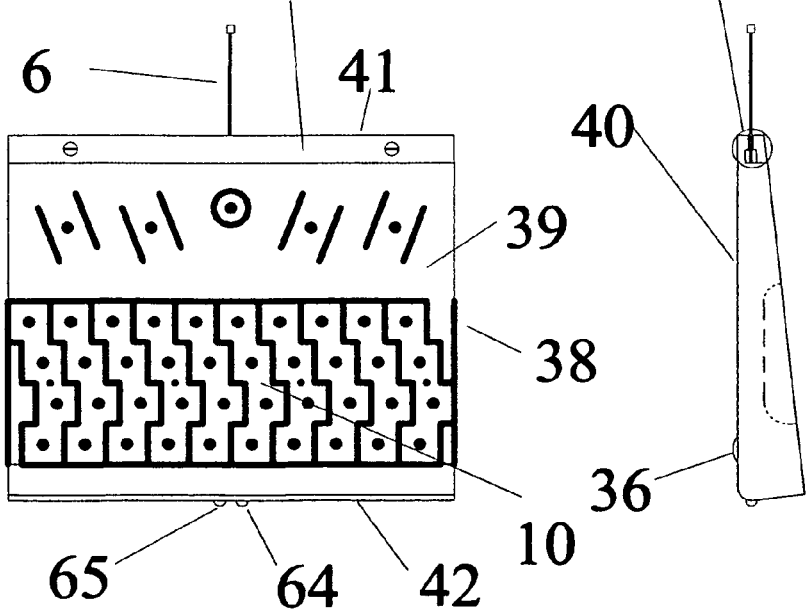
FIG. 45D, FIG. 45E, FIG. 45C, FIG. 45A, FIG. 45B

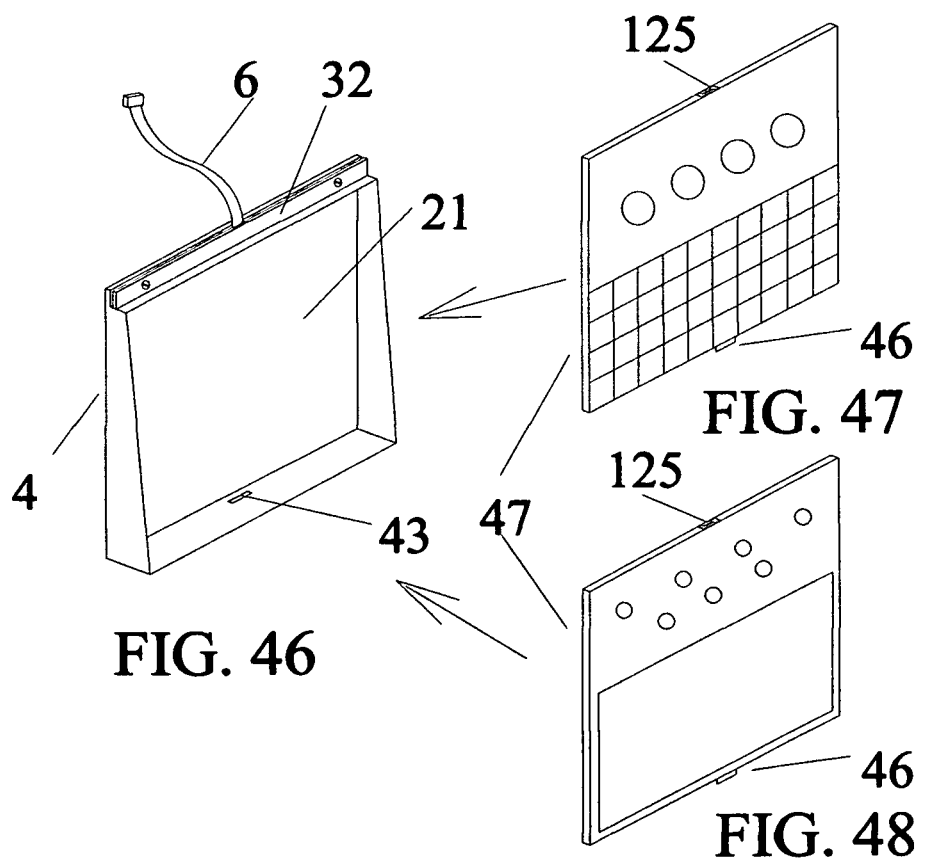

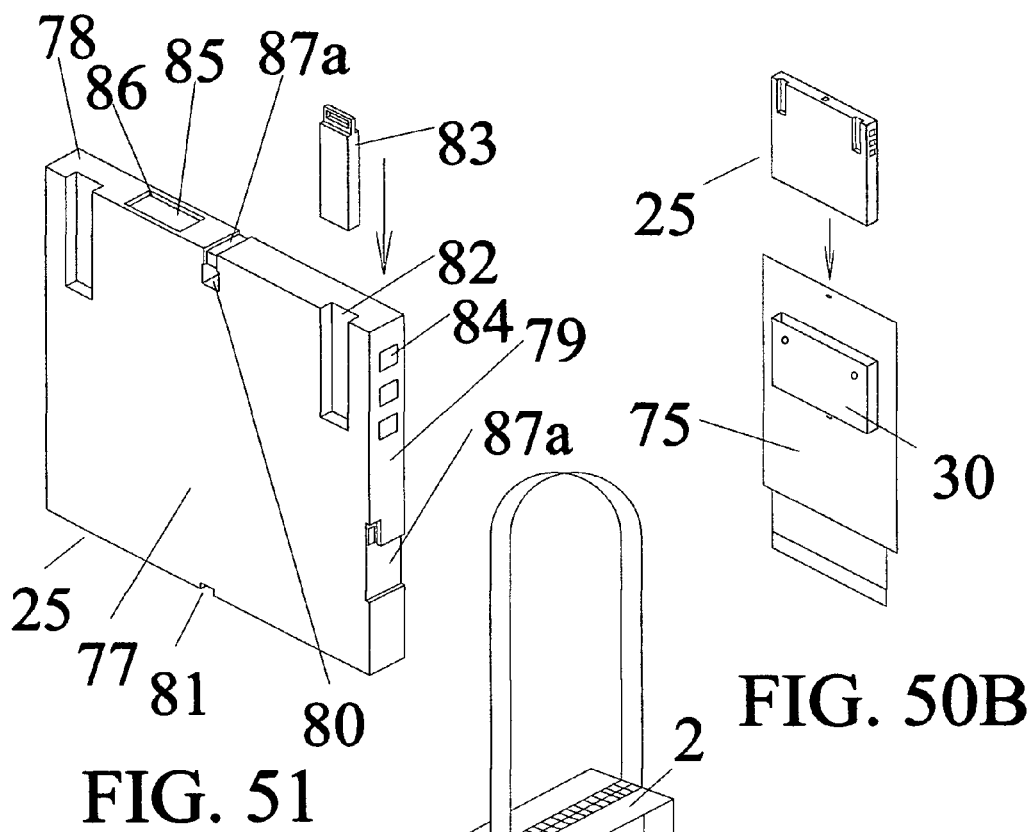
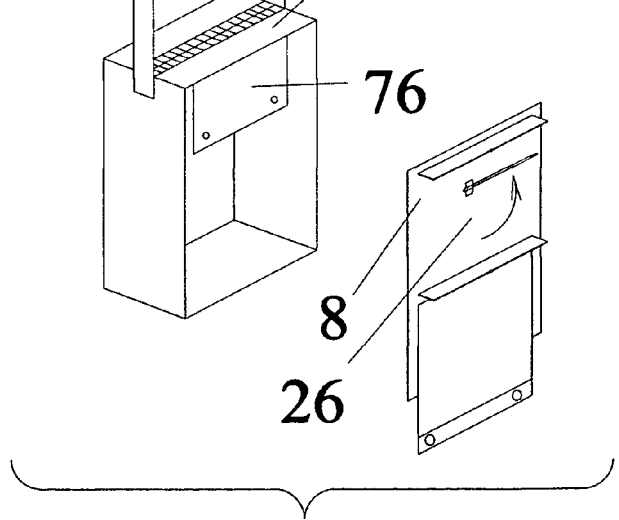
FIG. 51
FIG. 50B
FIG. 50A

BAG COMPUTER SYSTEM AND BAG APPARATUS

CROSS-REFERENCE TO RELATED APPLICATIONS

This application is a Continuation application of copending patent application Ser. No. 12/925,953, filed on Nov. 4, 2010, now U.S. Pat. No. 8,194,398 which is a Continuation application of patent application Ser. No. 12/216,650, filed on Jul. 9, 2008, now U.S. Pat. No. 7,881,048 which is a Continuation-In-Part of U.S. application Ser. No. 11/796,920, filed May 1, 2007 now abandoned, and which is a Continuation-In-Part of U.S. application Ser. No. 11/799,011, filed May 1, 2007 now abandoned. The disclosures of all of these U.S. patent applications are incorporated herein by reference.

TECHNICAL FIELD

The present invention relates to a computer bag designed to mount computer equipment on its front, computer equipment and system for mobile use.

BACKGROUND OF THE INVENTION

The more people use computers the more they want to use them while moving around. The most common portable computers are handhelds and laptops.

Handhelds are conveniently used while moving. But, because of their small size, cannot display standard internet or Windows programming. They have to be held, thus disabling at least one hand. Standard typing is impossible and the small size limits many other computer function.

The laptop, while portable and providing for standard desktop features, is too awkward to be carried and used at the same time. There have been adaptations to computer bags to deal with this problem. For example, there are convertible carrying cases such as the computer support U.S. Pat. No. 6,381,127 consisting of a carrying bag and shoulder/back straps. This invention can be a carrying case and then be converted into a laptop suspension system for operation in front of the operator. However, there is considerable set up to use this invention and, when set up for use, it is bulky and awkward.

There are also wearable computing systems where the computer can be both carried and operated at the same time. For example, are vests such as the Wearable Harness with equipment pockets U.S. Pat. No. 6,443,347. There are belts such as the wearable belt/vest including a fold out display panel 2002/0074570. These have the restrictions of specialized and possibly unstylish apparatuses that are unusual and must be worn. They also support only small displays and have no storage room for sizable general cargo.

The inventions of application Ser. No. 11/796,920 and Ser. No. 11/799,011 describing a computer and a bag with components including a bag, a display, a display back touchpad, a cover, a keyboard, a electronic write pad, an inside mounting structure and a computing unit with one or two panels. This application is a continuation of and includes improvements to these inventions. The number of components, their special relationship and means of usage characterize an innovative system and method.

The objectives of the bag computer include:

A mobile computer, when closed, looks like a regular bag and can be easily mixed with any normal apparel the operator might be wearing.

A mobile computer that can be accessed and ready to use in less than 3 seconds with no need to dig into the bag's interior.

A mobile computer with a display large enough to show standard desk top internet and Windows programming.

A mobile computer what will support a keyboard with standard size keys that can be used with two hands held in a natural position.

A mobile computer that has a large graphic user interface surface located conveniently and does not interfere with display usage.

A mobile computer that leaves the operator's hands free to be used for other chores A mobile computer that cannot be dropped or left behind.

A mobile computer that can be used standing, sitting or lying down.

A mobile computer bag that has a sizable cargo area to carry general cargo, peripherals or batteries.

A mobile computer bag that can be replaced for style or wear while keeping the same computer equipment.

Other benefits of this invention will become more apparent with description.

BRIEF SUMMARY OF THE INVENTION

A bag computer is the combination of a bag and computer which allows the bag wearer to quickly access and use a computer while mobile. The bag computer system can be in three forms and all three are used in the same way: a pivoting cover is moved out of the way to expose a display which pivots around the area near the junction of the front and top bag walls and into the line of sight of the wearer/operator. The three forms are; 1) a computer with a computing unit panel and a display panel hinged together with a computer support structure on the bag holding the computing unit panel to the bag so the display can pivot around the corner of the top and front bag walls; 2) a display panel, with a computing unit inside the panel, removably and pivotally attached near the corner of the top and front bag walls; 3) a display panel removably and pivotally attached to the corner of the top and front bag walls and electrically connected to its computing unit found in a separate computing unit panel which is mounted in a computer support structures on the inside of the bag's front wall. With components installed and the system ready for use, all the components are physically connected. The electrical components are electrically connected by wire or wireless.

In each case there is a pivoting cover which defines the outside bag front computing equipment storage area and covers and protects the display on the display panel.

In addition, there may be a molded cover or manual character input device, such as a keyboard or electronic write pad, attached to the inside surface of the pivoting cover. The cover may be shaped to fit the stored display panel and may be configured as a receptacle to accept a removable manual character input device insert containing the operative interface for the input device.

Instead, the molded cover, manual character input device or receptacle may be pivotally attached to the bag by a separate pivoting mount found near the center of the bag front.

Side pockets with rigid inserts matching a desired removable peripheral may be on the bag's side walls with electrical connection provides to connect the peripheral to the bag's computing unit.

As an example of the bag which forms the central holder for the bag computer components, a bag is described which has pivoting attachments consisting of flexible fabric attachment flaps matching the clamp jaws found on the display, cover, receptacle or manual character input device edge. There may be openings in the bag's front wall to allow electrical wires from the outside equipment to pass to the bag's interior. The bag's attachment flaps may be double layered with a passage to lead and cover wiring from the computer equipment through to the front wall opening and bag interior. This bag has a computer support structure attached to the inside of the bag front wall for holding the computing unit panel in place for electrical connection to the display and, if present, manual character input device. The computing unit panels also acts as a rigid front panel support to flatten the bag front and make the pivoting equipment store better against the bag front.

In addition, the bag may have a display prop which braces between the bag front and display panel back to hold the flap mounted display panel at various angular positions.

BRIEF DESCRIPTION OF THE SEVERAL VIEWS OF THE DRAWING

FIG. 1A This is a front view of a mannequin wearing a bag computer in the stored position.

FIG. 1B This is a side view of a mannequin wearing a bag computer in the stored position.

FIG. 2 This is the bag computer with the cover closed in stored position.

FIG. 3 This is the bag computer with the cover open, the display panel pivoted flat against the bag front and the keyboard ready for use.

FIG. 4 This is a side view of a mannequin wearing a bag computer and using it sitting with the cover open, the display panel pivoted flat against the bag front and the keyboard ready for use.

FIG. 5A This is a front view of a mannequin wearing a bag computer while standing, viewing the display on the display panel and manipulating the input controls on the display panel.

FIG. 5B This is a side view of a mannequin wearing a bag computer while standing, viewing the display on the display panel and manipulating the input controls on the display panel.

FIG. 6A This is a front view of a mannequin wearing a bag computer while standing, viewing the display on the display panel and typing on the keyboard.

FIG. 6B This is a side view of a mannequin wearing a bag computer while standing, viewing the display on the display panel and typing on the keyboard.

FIG. 7 This is the bag computer with the cover open, the display panel pivoted approximately perpendicular to the bag front with the display facing up for viewing by the wearer and the keyboard ready for use.

FIG. 11 This view of the bag computer shows the back side of the display panel with its controls, the bag prop and the receptacle to hold a manual character input device.

FIG. 12 This view of the bag computer shows the computer support structure on the bag front to hold the body of a two panel computer with pivoting display.

FIG. 13 This view of the bag computer shows a single panel computer with internal computing unit attachable to the bag with matching/pivoting attachment.

FIG. 14A This is an exploded view of the bag computer showing internal computer support structure components and outside side pockets with matching rigid peripheral holder.

FIG. 14B This is a view of the inside of the bag computer's front wall with internal computer support structure components ready to accept a computing unit panel.

FIG. 15 This is a high level functional block diagram of the bag computer system. The dotted line enclosed the essential components.

FIG. 16 This is detailed functional block diagram of the top bag position for the display found in the high level functional block diagram.

FIG. 17 This is detailed functional block diagram of the bottom bag position for manual character input device (MCID)/cover components found in the high level functional block diagram.

FIG. 18 This is detailed functional block diagram of the pivoting cover found in the high level functional block diagram.

FIG. 20A The bag is shown with one attachment flap at the top front of the bag ready for clamping a display in place.

FIG. 20B In this magnified view, the display's clamp jaws are shown. They are adapted to match and clamp to the flexible fabric attachment flap on the bag.

FIG. 21 In this example, the attachment flaps matching the computer equipment clamps are divided into two right and left attachment flaps which pivot on the same horizontal axis.

FIG. 23A This bag, with both a top and bottom attachment flap, has electrical access openings leading through the attachments flap and bag front to the bag interior. The electrical connections are part of the computer equipment.

FIG. 23B This is a magnified view of the computer equipment clamp jaws used to attach to the attachment flap.

FIG. 23C This is a magnified view of the electrical access opening on the edge and through two layers of the attachment flap.

FIG. 27A This is a side view plan of the bag computer with a friction prop and the display panel in stored position.

FIG. 27B This is a side view plan of the bag computer with a friction prop and the display panel in the 90 degree viewing position.

FIG. 27C This is a magnified view of the friction prop area of the bag computer display panel in the 90 degree viewing position.

FIG. 27D This is a side view plan of the bag computer with a friction prop and the display panel in the 180 degree viewing position.

FIG. 27E This is a magnified view of the friction prop area of the bag computer display panel in the 180 degree viewing position.

FIG. 27F This is a front view plan of the bag computer with a friction prop and the display panel in the 180 degree viewing position.

FIG. 28A This is a side view plan of the bag computer with a sliding prop with button lock and the display panel in the 180 degree viewing position.

FIG. 28B This is a magnified view of the sliding prop with button lock area of the bag computer display panel in the 180 degree viewing position.

FIG. 29A This is a side view plan of the bag computer with a sliding prop with lever lock and the display panel in the 180 degree viewing position.

FIG. 29B This is a magnified view of the sliding prop with lever lock area of the bag computer display panel in the 180 degree viewing position.

FIG. 30A This is a side view plan of the bag computer with a friction hinge prop and the display panel in stored position.

FIG. 30B This is a side view plan of the bag computer with a friction hinge prop and the display panel in the 90 degree viewing position.

FIG. 30C This is a magnified view of the friction hinge prop area of the bag computer display panel in the 90 degree viewing position.

FIG. 30D This is a magnified view of the friction hinge prop area of the bag computer display panel in the 90 degree viewing position.

FIG. 30E This is a side view plan of the bag computer with a friction hinge prop and the display panel in the 180 degree viewing position.

FIG. 30F This is a magnified view of the friction hinge prop area of the bag computer display panel in the 180 degree viewing position.

FIG. 31 This is a view of the friction hinge display panel prop without the bag

FIG. 32 This is a view showing that two or more display panel props can be used with the bag computer.

FIG. 33A This is a plan view of the front side of the display panel with the display visible.

FIG. 33B This is a plan view of the side of the display panel.

FIG. 33C This is a plan view of the attachment edge of the display panel with the clamp connection and electrical connection visible.

FIG. 33D This is a plan view of the side of the display panel showing how the front side display part and back side pointing device part attach together.

FIG. 33E This is a magnified side view of the clamp area of the display panel.

FIG. 33F This is a magnified attachment edge view of the clamp area of the display panel showing the electrical connection and channel for it in the clamp jaws.

FIG. 42A This is a front plan view of the bag computer with the manual character input device and cover flap pivoted up in stored position to cover and protect the display.

FIG. 42B This is a side plan view of the bag computer and input device shown in FIG. 42A.

FIG. 42C This is a side plan view of the bag computer with the manual character input device and cover flap pivoted down in operating position to expose the MCID and display for use. In this case, the MCID is mounted to the inside surface of the cover flap by its back side.

FIG. 43A This is a front plan view of the bag computer with the manual character input device with the cover flap open and the input device, a keyboard in this case, pivoted down for use.

FIG. 43B This is a side plan view of the bag computer and input device with the cover flap open and the input device, a keyboard in this case, pivoted down for use.

FIG. 43C This is a side plan view of the bag computer and input device with the cover flap open and the input device, a keyboard in this case, pivoted down for use. Here it can be seen that the input device is removable and separate from the bag's cover flap.

FIG. 44 This is a magnified side plan view of the input device attachment area with bag attachment flap and input device clamp jaws visible.

FIG. 45A This is a front plan view of the manual character input device, a keyboard in this case, showing the various features.

FIG. 45B This is a side plan view of the manual character input device showing features such as the alignment structures.

FIG. 45C This is the manual character input device shown from the proximal attachment edge.

FIG. 45D This is a magnified view of the manual character input device proximal attachment edge and its electrical connection area.

FIG. 45E This is a magnified side view of the manual character input device clamp attachment area of the proximal attachment edge.

FIG. 46 This is the manual character input device as a cover which may be used as a receptacle for a removable input device insert such as a keyboard or electronic write pad.

FIG. 47 This is a keyboard input device insert made to be inserted into the manual character input device cover/receptacle.

FIG. 48 This is a electronic write pad input device insert made to be inserted into the manual character input device cover/receptacle.

FIG. 50A This is an exploded view of the bag computer bag showing general features and internal computer support structure parts.

FIG. 50B This is a view of the inside surface of the bag front wall and internal computer support structure parts found there.

FIG. 51 This view shows the computing unit panel and its various features.

DETAILED DESCRIPTION OF THE INVENTION

Figure 8:
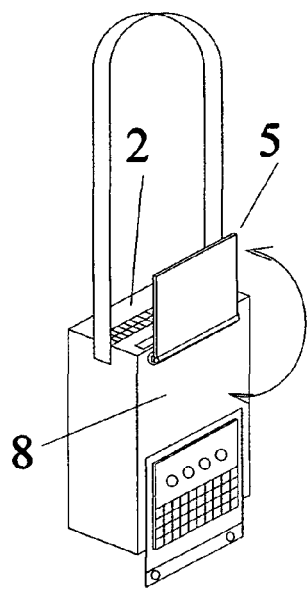
FIG. 8 This is the bag computer with the cover open, the display panel pivoted approximately parallel to the bag front but above the bag top with the display facing back for viewing by the wearer from behind the bag and the keyboard ready for use.

As shown in FIGS. 1A, 1B and 2, the bag computer is a combination of bag 1, computer and input/output devices that results in a mobile, self contained wearable computer. The bag is suspended from the operator body by a shoulder strap 99 so it can be carried normally or swung around in front of the operator for use. The input output devices are located on the outside of the bag's front wall so that they can be operated without accessing the interior of the bag. When the computer equipment is stored it is covered with a cover 4 on the bag's front wall 8 and the bag computer 98 appears to be a normal piece of apparel. Because the computer equipment is mounted to either the inside surface or outside surface of the bag's front wall, the majority of the bag's interior can be used for general cargo, eliminating the need to carry separate computer and general cargo bags.

Figure 9:
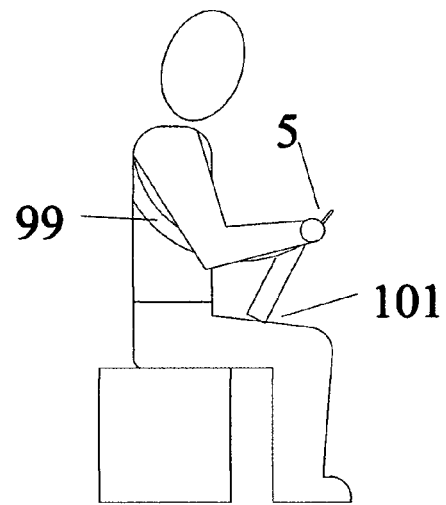
FIG. 9 This is a side view of a mannequin wearing a bag computer while sitting, viewing the display on the display panel from behind the bag and manipulating the input controls on the display panel.
Figure 10:
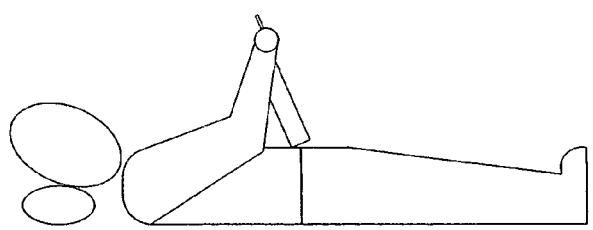
FIG. 10 This is a side view of a mannequin wearing a bag computer while laying down, viewing the display on the display panel from behind the bag and manipulating the input controls on the display panel.

As shown in FIG. 3, when the cover 4 is opened the input/output computer equipment 100 is exposed for use. A display panel 5 is removably and pivotally attached to the area of the bag near the junction of the front and top walls 16 using a pivoting computer equipment mount so the panel can pivot along a horizontal axis. In this location, the display panel is as close as possible to the operator's eyes in order to present the largest apparent display size possible. The display panel may pivot down over and parallel to the front wall of the bag with its display 37 facing away from the bag front. When covered, FIG. 2, this is the display panel storage position. When uncovered, FIG. 3, this position is good for sitting FIG. 4 and typing because both the display and keyboard are exposed to operator view. Shown in FIGS. 5A, 5B and 7, from there the display panel 5 can pivot up to a position approximately perpendicular to the bag front 8 for viewing the display 37 and manipulating display panel mounted controls while standing. FIGS. 6A and 6B show this position can also be used for typing while standing. Shown in FIG. 8, the display panel 5 can be further pivoted to a position parallel to the bag front wall 8 but above its top wall 2 were it can be viewed from in back of the bag while the bag is stood on its bottom 101 in the lap and restrained by the shoulder strap 99 as in FIG. 9. This position can also be used while lying down as in FIG. 10.

The display panel is pivotally attached to the bag using a hinge means. This hinge means may be capable of holding an angular position. In the case where the display panel to bag pivoting attachment is a flexible fabric flap, there may be a bag prop, such as a pivoting stick, which fits between the display panel and bag front to hold the display panel in any one of several angular positions. In one example, shown in FIG. 11, the display panel prop 14 is employed by using one hand to place the prop end into one of several display panel bag receptacles.

The display panel has manual controls so that the computer can be operated from the display panel. A pointing device 22 may be located on the display panel 5 back so that the display can occupy one entire side of the display panel. The controls can be used at the same time the display and bag are stabilized with the hands. The side of the display panel opposite the display may be mostly touch pad so that it can have extensive controls. The display is removable from the bag for replacement of the bag.

There may be a pivoting cover to protect the display, such as a flap, a rigid panel shaped to fit and cover the display while stored or a combination of the two. The cover has an inside surface which faces the bag front when it is in stored position. The cover may be attached near the center of the bag front. The cover, then, may define a computer equipment storage area with the display near the top and the cover attached near the bottom of the storage area. The cover may have a manual character input device (MCID) mount on its inside surface to removable mount a MCID to the cover flap. The pivoting cover may be shaped to form a receptacle 21 to hold a choice of removable MCID inserts, for example, a keyboard or electronic write pad. The pivoting cover is separate from but may be used in combination with a bottom bag position pivoting computer equipment mount. For operation, the cover may be pivoted down and the display panel pivoted up so that the display can be viewed and the manual controls operated.

Shown in FIG. 12, a manual character input device (MCID), such as a keyboard 10 or electronic write pad, may be attached directly to the bag front wall and may be removable. Alternatively, the MCID may attach to the inside surface of the cover and it may be removable. The MCID, instead, may be attached to the bag using a pivoting computer equipment mount separate from the cover and near the junction of the cover and the bag front wall but within the computer equipment storage area. In either case, the input device and cover may pivot up and over the display panel when the equipment is stored. The manual character input device is electrically connected to the computing unit. A keyboard, when pivoted down and open for use, is on the lower part of the bag so that the hands may access it while they are hanging relaxed but the display panel is as close as possible to the operator's eyes. As an electronic write pad, the input device may be held with one hand while the other hand writes ideograms or other special characters for entry into the computer without need for a touch screen or display occupying sub-programming.

The bag computer computing unit is removably attached to the bag.

The computing unit may be found in a separate computing unit panel 93 which is pivotally and electrically attached to the display panel in a way similar to a lap top or note book computer. In this case, though, the display on the display panel may face away from the computing unit panel when they are closed together and the computing unit panel has size, shaping, and/or attachments to match a computing unit support structures, such as a docking port, holster 31, hanger or other means matching the computing unit panel, on the inside or outside of the bag which holds the computing unit panel and display panel to the bag.

Shown in FIG. 13, the computing unit may be found in the display panel 5 and no electrical connection to the interior may be required.

Shown in FIGS. 14A and 14B, the computing unit may be a separate computing unit panel 25 that is not physically attached to the display panel. A unit of this type would normally be held to the inside surface of the bag's front panel using a computing unit panel support structure 7 on the bag which the computing unit matches in size, shaping, and/or attachments. The computing unit panel is of shape and size so that it may act as a rigid support for the bag's front wall 8 and render flat the storage area on the outside of the bag's front wall so that the display and manual character input device may store against the bag front. The computing unit would have an electrical connection through the bag's front wall to the display panel and, if present, the manual character input device.

The bag may have side pockets 12 with a small electrical access hole or plug to the bag's interior so that a peripheral 27 mounted in the pocket can make electrical connection to the computer via the bag's interior. The bag may be supplied with a rigid peripheral holder(s) 35 to fit both the side pockets and the peripheral. These may have electrical connection, shaping and, if present, attachments so that the holder's outside matches the pocket and electrical access hole. The rigid peripheral holder has a receptacle shaped and with electrical connection to match, hold and electrically connect the specific peripheral to the bag's interior and computing equipment.

The bag computer may be seen as a system wherein the bag is a central mounting unit to which computing equipment is attached. In this way the bag computer system is analogous in function or a "tower" computer with its multiple pieces of attached computer equipment. The use of several separated components, rather than a single computing/input/output component combination, may facilitate equipment replacement, make the system more available at lower cost and make the system more durable.

FIG. 15 is a high level functional block diagram of the bag computer system. The blocks enclosed by the dotted line represent the minimum system and include the bag 1 with strap for holding the bag to the operator's body, top bag position for the display and, if present, computer components 102a and a pivoting cover 103a. In addition, the system may further include a bottom bag position for manual character input device (MCID)/cover components 104a, display prop 105, side pocket with holder 106 and inside computer support structure 107a. When assembled, the components are physically attached using complimentary attachments. When installed the electrical components are electrically connected by electrical conductor or, if only data is transferred, wireless transmission.

FIG. 16 is a detailed functional block diagram of the top bag position for the display and, if present, computer components 102b. To provide for both the pivoting display panel and the computing unit, there are three optional arrangements: 1) Option one is a combination of a top bag position pivoting computer equipment mount 108a to hold the display panel 109 and an inside computer support structure 107b to hold the computing unit panel 111. The display panel, in turn, has the option of a display combined with controls 115a or separate display 116a and pointing device components 117a. 2) Option two is a computer support structure 114 to hold a computer composed of hinged display and computing unit panels 112. The display panel may have controls 126. 3) Option three is a top bag position pivoting computer equipment mount 108b made to hold a display panel 109 which include the computing unit 113. Also shown is the display panel option of having a display combined with controls 115b or separate display 116b and pointing device components 117b.

FIG. 17 is a detailed functional block diagram of the bottom bag position for manual character input device (MCID)/cover/receptacle components 104b. Here there are two options for mounting the MCID in the bottom bag position; 1) a bottom bag position pivoting computer equipment mount 108c which may hold a display cover 120, input device receptacle, manual character input device such as a keyboard 124a or electronic write pad 119a by one edge or 2) a stationary computer equipment mount 118 which would hold a manual character input device by its back or edges by, for example, riveting, a docking port or other means. Optionally, the display cover may be fitted with a removable/exchangeable keyboard 124b or electronic write pad 119b components.

FIG. 18 is a detailed functional block diagram of the pivoting cover 103b for which there are two options; 1) a "pull over cover" 121 which would normally be a flexible fabric flap which permanently attaches, for example with sewing or riveting, to the top front, top or top back of the bag and exposes the computer equipment when pulled from its storage position over the bag front wall up and over the top of the bag to a position adjacent to and covering the back wall of the bag; 2) a "fall down cover" 122 which may be permanently attached near the front center of the bag and uncovers the computer equipment by pivoting out and down from its storage position covering the top portion of the bag front wall so that, when the computer is in operation, it lays flat over the bottom portion of the bag front wall. The fall down cover may be a flexible fabric flap which attaches to the bag front wall by sewing, riveting or other means. The cover may alternatively be rigid and attached to the bag front wall with a hinge means such as an axle bearing hinge or intermediate flexible fabric hinge means. A rigid cover may be shaped, for example, with side panels, to fit and protect the display and other computer equipment in the computer equipment storage area on the top portion of the bag front wall. A fall down cover may have a MCID/cover/receptacle 123 such as a molded cover, manual character input device (MCID) or MCID receptacle or a combination of these attached to its inside surface by clamping through the cover to a backing plate, riveting or by using a matching mount attached to the inside surface of the cover. A removable MCID inserts, such as a keyboard 124c or electronic write pad 119c, may match and be mounted to the MCID receptacle facing the display panel when in storage position so the MCID insert may face outward and available for use when the cover is pivoted down into operating position.

Other features which may be found in the bag computer include one or more rigid panels in bag walls or flaps, reinforced bag areas associated with individual attachments or stress areas bumpers on the inside or outside of the bag to buffer to protect the computer equipment from collision with outside objects or the various moving parts of the bag, elastic in flaps or mounts to improve fit and ease installation of the parts, side pocket electronic equipment holders, sound openings in the bag's top panel for sound to exit the bag from inside computer speakers, further inside pockets or lining to hold computer equipment and cover electrical connections, one or more antennas for radio, TV, GPS or other telecommunications. The shoulder strap attachments may be shifted to the right and left sides of the bags back wall and so the bag may be worn around the waist as a belly bag without any change of function.

Below is specific example of a bag computer system. Its purpose is to simplify the bag construction and make it lighter while gaining the advantages of a multiple component. As described below, the system used a bag with attachment flaps to match clamp attachments on the display/computer and MCID/cover components.

Figures 19A, 19B:
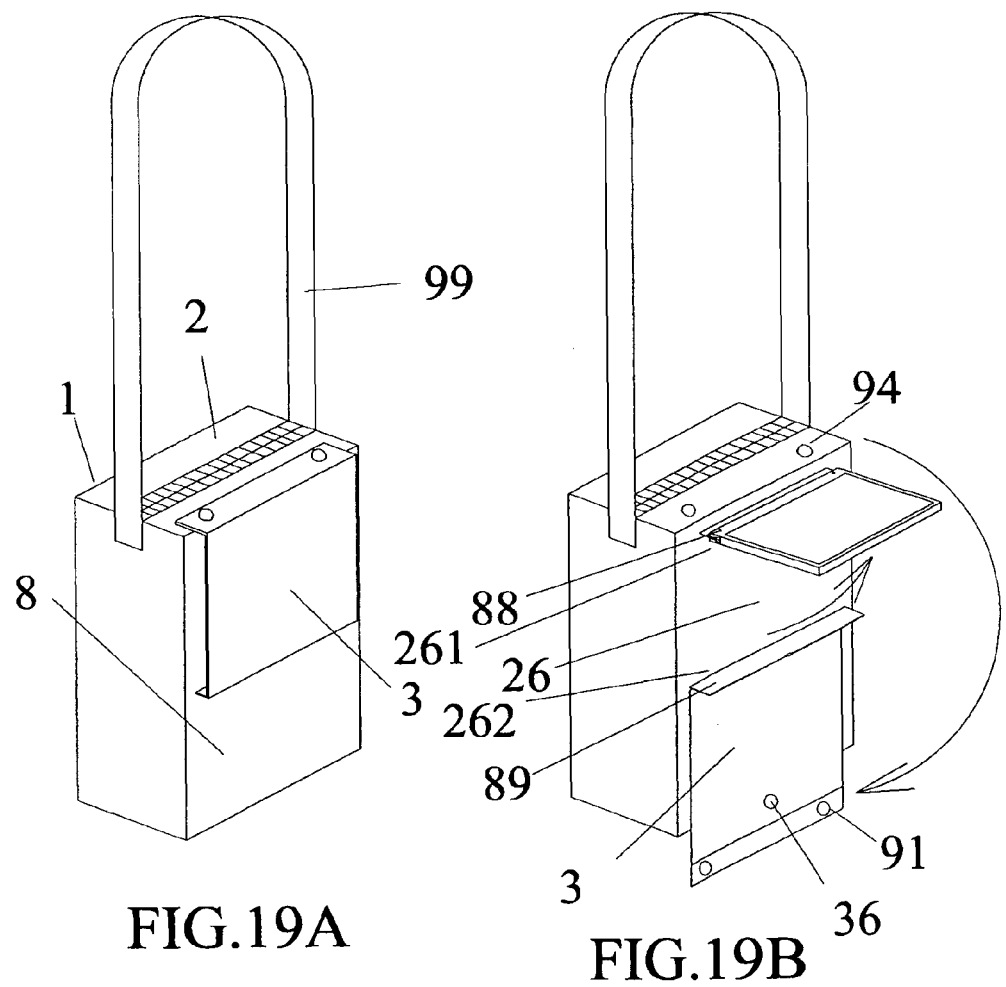
FIG. 19A This is the bag computer with pivoting computer equipment mounts adapted for clamp attachment with the cover closed and the equipment stored.
FIG. 19B This is the bag computer with pivoting computer equipment mounts adapted for clamp attachment with the cover open, a display panel clamped to the top equipment mount and pivoted for the operator/wearer to view the display from above.

Shown in FIGS. 19A and 19B, the bag 1 used in the bag computer has a front wall 8 and opposite back walls, two side walls, a top wall 2 with opening to access the interior and an opposite bottom wall. The opening would normally have a closure such as a zipper. Each wall has an inside and outside surface. The bag may have a shoulder strap 99 for carrying the bag and holding the bag in position on the operator for use. The strap may be removable and replaceable. The bag has a defined computer equipment storage area 26 toward the top end of the outside of the bag's front wall. The storage area may be defined either by a cover flap 3 of a size and shape to fit the computer equipment or by the presence of a top bag position pivoting computer equipment mount 88 and bottom bag position pivoting computer equipment mount 89 positioned at the top 261 and bottom 262 of the storage area.

There may be a cover flap 3 and it may be separate from a rigid cover held in the bottom pivoting computer mount. The cover is pivotally attached so that it can fold over, protect and conceal an area defining the computer equipment storage area 26. The cover may be attached, by sewing or riveting for example, near the center or lower part of the bag's front wall so that it may be pivoted downward to expose the computer equipment for use. The cover flap may have a manual character input device, molded cover or MCID receptacle mounted directly to the inside surface of the cover by, for example, clamping through to a backing plate or by riveting or there may be a mounting structure such as a docking port, matching fittings, holes, stitching or other facilities on the cover flap inside surface to match and assist in removably holding the MCID/cover/receptacle to the cover flap. The cover flap may have provision, such as an opening through the bag's front wall, for electrically connecting the input device to the bag's interior. Another example for provision for electrical connection may be a cover flap constructed of two layers of bag material with an opening in one layer to gain access between the layers where equipment wiring may pass further to a hole for wiring to enter the interior of the bag.

To hold a cover attached to the center front of the bag in the closed position, the cover may have one or more releasable attachments 91 near its distal end and matching attachments 94 on the bag's top wall or near the top of the bag front. The attachments may be hooks, snaps, magnets, for example, and there may be elastic in the flap. The flap may also have a flap to MCID attachment 36 to hold the flap to the MCID so they can move as one.

Shown in FIGS. 20A and 20B, to allow the computer equipment, such as a display panel 5 or manual character input device, to be both removable and pivoting, it may be attached to the bag using a pivoting computer equipment mount. One or two of these equipment mounts may be located on the bag at the top or bottom ends of the defined computer equipments storage area 26 (or top bag position and bottom bag position pivoting computer equipment mounts respectively) so that the mounted computer equipments may pivot from the storage area into operation position.

A pivoting computer equipment mount may be a short flexible fabric attachment flap 34 of a size, shape and material to match the clamp jaws 15 on the attachment edge of the computer equipment to be stored on the bag front. The equipment mount may be sewn, riveted or otherwise fixed to the bag front so that they may pivot along a horizontal axis.

The attachment flap may be located near the junction 16 of the top and front bag walls so that a mounted display may be located as close as possible to the operator's face. The attachment flap may be an extension of the bag's top wall projecting over the front wall.

Shown in FIG. 21, the attachment flap may be divided into right and left parts. For example, there may be two tab-like attachment flaps 34 aligned on one horizontal axis and designed to match clamp jaws 15 on the right and left extremes of the computer equipment's 95 attachment edge.

The attachment flap may be plain flexible fabric of a size, shape and material to fit the computer equipment clamp jaws. The attachment flap may have holes to match the computer equipment clamp jaws. The attachment flap may have and embroidered pattern or a distal end bar, rope, hem or ledge to help align and hold the computer equipment's clamp jaws to the attachment flap.

Figure 22:
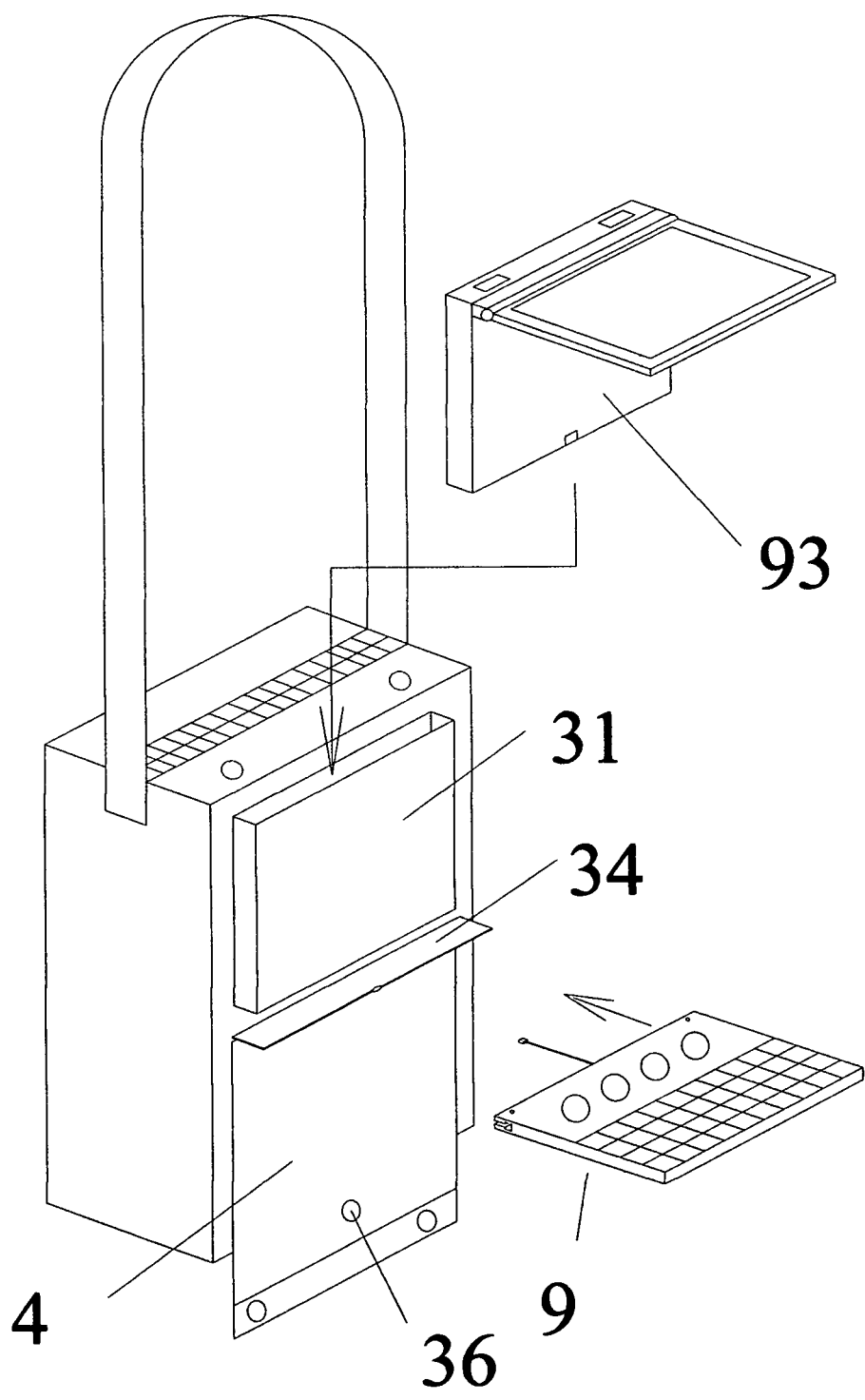
FIG. 22 This bag has a computer equipment support structure, in this example a holster, holding a computing panel and its display in place near the top front of the bag while a pivoting computer equipment attachment flap is used to hold the manual character input device in place in the bottom equipment position near the center front of the bag.

Shown in FIG. 22, the attachment flap 34 may be located near the bottom of the bag's equipment storage area or near the center of the bag's front wall. This location is used for mounting a manual character input device (MCID) 9. As with a top attachment flap, this flap may have features such as holes or edge bar to help align and hold the computer equipments clamp jaws to the attachment flap. As with the top attachment flap, this flap may be divided into right and left parts.

On the surface of the cover facing the bag front when closed there may be one or more flap to MCID attachments 41 to match complimentary fixtures on a manual character input device, such as a keyboard or electronic write pad, mounted on the lower attachment flap. This attachment allows the input device and down folding cover to move together as one.

If there is one attachment flap located near bottom of defined computer equipment storage area there may be a display/computer support structure in the upper part of the equipment storage area. In this arrangement, the manual data input device may pivot up and overlay the display and, if present, computer unit 93 found in the display/computer support structure. The cover 4, defining the computer equipment storage area, covers all equipment.

The display/computer support structure may be a holster 31, docking port, fitted pocket with opening, axle hinge with computer attachment, pivoting computer equipment mount, hanger, inside computer mount with an opening in the front or top bag through which a display panel is passed from a computer mounted inside the bag or other way to attach a display, and computer if present, to the bag front wall so that the display can be hinged around the top front bag corner into the line of sight of the operator.

There may be an electrical connection such as a plug associated with any computer mounting structure to connect the display/computer unit with the manual input device or to the inside of the bag.

Shown in FIGS. 23A, 23B and 23C, there may be two attachment flaps 34, one located at the top and one at the bottom of the bag's computer equipment storage area so that both a display panel 5 and manual character input device 9 may be mounted on attachment flaps at the same time.

The bag may be adapted to allow computer equipment mounted to the bag's attachment flaps to be electrically connected through the bag and its front wall to the interior so that it may be removably connected with other peripherals or to a computing unit panel inside the bag.

Electrical wiring and plug may be part of the bag and/or attachment flap with the computer equipment having a plug to match it.

Alternatively, the electrical connection may be a wire 6 of an appropriate diameter and length, including any plug, leading from the computer equipment, through an electrical access opening in the front wall of the bag and connecting with a peripheral or a computing unit panel inside the bag. For example, there may be an opening in the bag's front wall next to the attachment flap and this may be toward the bottom of the front wall from the attachment flap so it is inconspicuous.

Instead, the attachment flap 34 may be constructed of two layers of material with an electrical access opening 96 in its distal edge and a channel between the two layers to an opening through the front wall. These openings and channel allow wiring from the display/computer or manual character input device to pass through its clamp jaws 15 and through the attachment flap and front wall to the computer without being visible. The opening and channel for the display or MCID wire may be positioned anywhere on the attachment flap edge to accommodate electrical connection. For example, the opening and channel may be toward the flap edge center to match a center plug on the computing unit panel or toward one side to accommodate a plug on the computing unit panel side. By using a wire and plug that is part of the display panel, no wiring need be included in the bag thus simplifying bag construction.

Figure 24B:
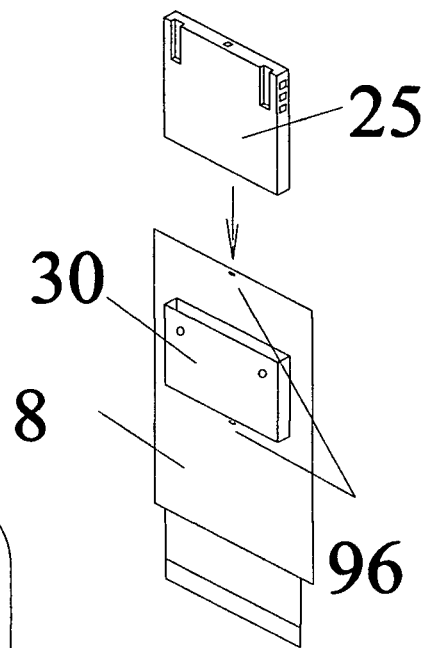
FIG. 24B This is a view of the inside surface of the bag's front wall showing part of the inside computing unit support structure and the electrical access openings.
Figure 24A:
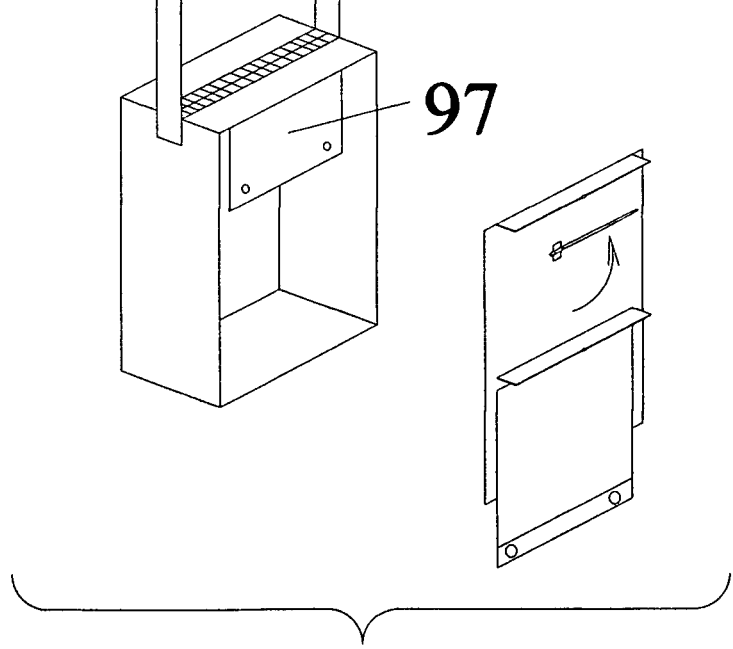
FIG. 24A This is an exploded view of the bag computer showing part of the inside computing unit support structure.

FIGS. 24A and 24B show the interior of the bag. There are electrical access openings 96 through the front wall. These allow electrical connection from the outside mounted computer equipment to a computing unit panel 25 mounted to the inside of the bag's front wall with an inside computer equipment support structure which aligns with the computing unit to the electrical access openings for proper connection. The electrical access opening for the manual character input device may open into the inside computer equipment support structure (hidden) such as a holster. Electrical access openings may also be used to connect with peripherals held in the cargo area of the bag.

There may also be openings in the bag's front wall or mounting structure to align and use IR communication between computer components. The bag may have a lens on the front wall to direct the signal inside the bag to an antenna on an interior mounted computing unit panel.

On the inside surface of the bag's front wall 8 there may be an inside mounting structure for additional computer equipment. The inside mounting structure may consist of a combination of a holster or footing 30 to hold the bottom end of the computing unit panel and a head piece, such as a flap 97, to hold the top end of the computing unit panel. The footing may be attached to the inside of the bag's front wall and consist of a metal or plastic ledge which may fit into a matching receptacle in the computing unit panel, it may consist of a flap which wraps around the bottom end of the computing unit panel and attaches to the back side of the computing unit panel or it may be socket/pocket like and made of bag material to fit the bottom end computing unit panel. The headpiece/flap may be permanently attached to the inside of the front or top bag walls by, for example, sewing or riveting. The footing and/or flap may have attachments matching ones on the computing unit panel. Instead, the flap attachments may attach to matching attachments on the footing so that the computing unit panel is mostly surrounded by bag material. Alternatively, the inside support structure may be molded panel, array of attachments or docking port of any sort which matches the computing unit panel and holds it to the inside of the bag's front wall. The inside mounting structure may include an electrical connection, such as a plug, to electrically join the mounted equipment with the outside equipment mounted to the attachment flaps. The inside mounting structure holds the computing unit panel to the inside of the bag's front wall, aligns the computing unit panel with electrical connections from the outside of the bag and keeps the computing unit panel from mixing with general cargo in the bag.

Figure 25:
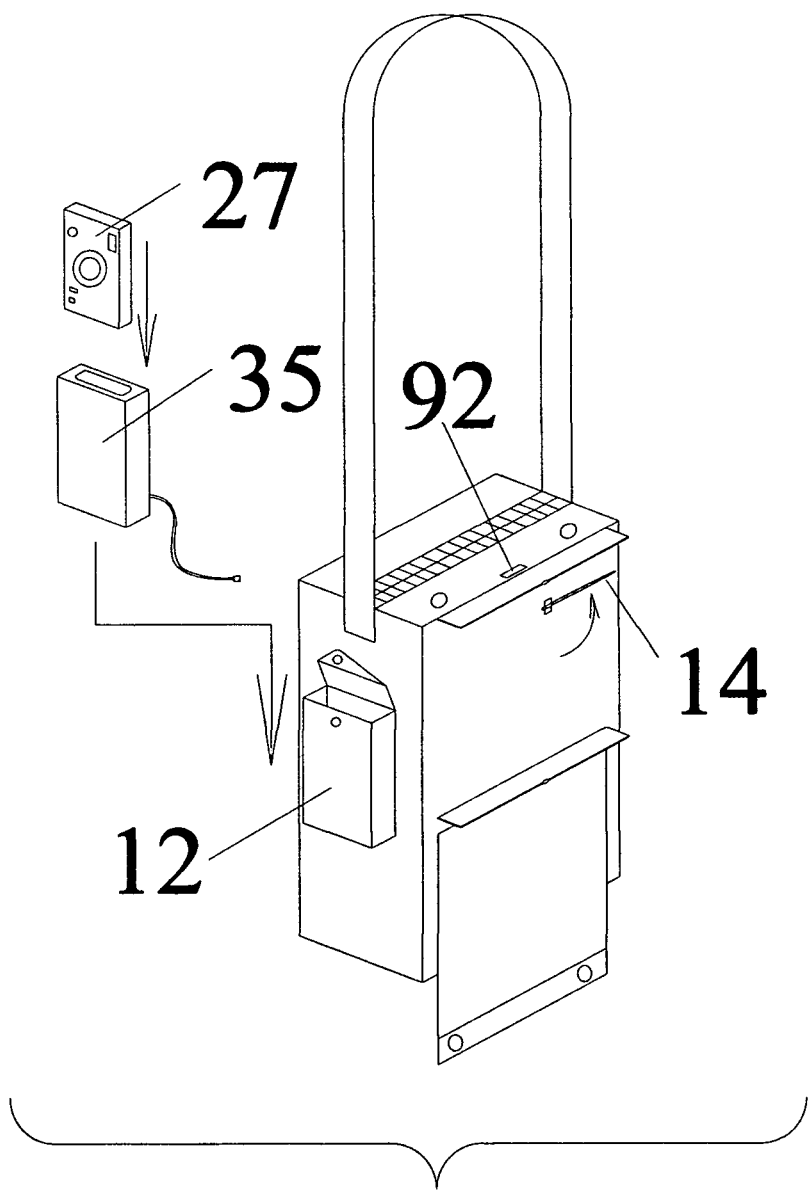
FIG. 25 In this drawing other features of the bag, such as side pockets with rigid holders, display panel prop and sound openings, are shown.

As shown in FIG. 25, the bag may have additional features.

Because the attachment flaps cannot hold an angular position, the bag may have a display panel prop 14 mounted to the bag front in the computer equipment area. The prop, described more fully below, temporarily holds the display panel in various angular positions relative to the bag front. It consists of a pivoting base, a prop and receptacles for the various positions. The pivoting base and prop would normally be on the bag front and the receptacles on the display panel back. However, the position may be reversed with the base and prop on the display panel back with the receptacles on a vertical strip on the bag front. Other prop arrangements fixed to the bag are possible.

The bag may have side pockets 12 fixed to the outside of its side walls to hold peripherals 27 for quick and convenient access. There may be a hole in the side wall which opens into the side pocket to create electrical access for peripherals held in the side pockets. The side pockets may be supplied with a rigid peripheral holder(s) 35 to fit both the side pockets and the peripheral held there. The rigid peripheral holder(s) may have shaping, wires and plug so that its outside can fit the pocket and its inside can fit the specific peripheral.

There may be one or more sound openings 92 in the bag's top wall for sound to exit the bag from speakers on the top edge of the inside mounted computing unit panel. The sound openings may have perimeter trim which matches the speaker openings in the computing unit panel and this trim may also be shaped to align and fasten to the bag's speaker openings to the computing unit panel.

There may be a lining on the inside surface of the bag and may include holders such as pockets, attachment loops or matching mounts for peripherals or for common computer accessories like earphones, electrical wire extensions for connecting to telecommunications, batteries or microphone, for example. The holders may be placed to align with the specific plugs in the computing unit panel to make connection easy and keep the wire lead short. The lining may include fabric covers to conceal wires.

To facilitate bag construction, the bottom bag position attachment flap and the cover flap may be the same piece of material sewn across the bag front so there are short (attachment flap) and long (cover flap) ends. In constructing the top bag position attachment flap, the top bag wall material may extend beyond the front wall, then fold and return to the front wall and top wall junction where is may be sewn in place. This makes a double layered attachment flap as close as possible to the junction of the top and front walls. Instead, top bag wall material may extend beyond the front wall, then fold and return to be sewn at the junction of the top and front walls and continue down the bag front as the front wall. Thus one strip of material may be used for the top wall, top pivoting mount and front walls.

The flap mounts allows the use of a variety of components and can have advantages over single combined computing units in terms of manufacturing diversity and rights, replacements, etc. One disadvantage of flap mounting, though, is that flaps don't hold a position if the operators wants to, for example, view his computer without using his hands. A means of correcting this problem while still keeping the simplicity/advantage of the flap mount is to use a display panel prop. The display panel and bag front can be adapted for this purpose.

Figures 26A, 26B:
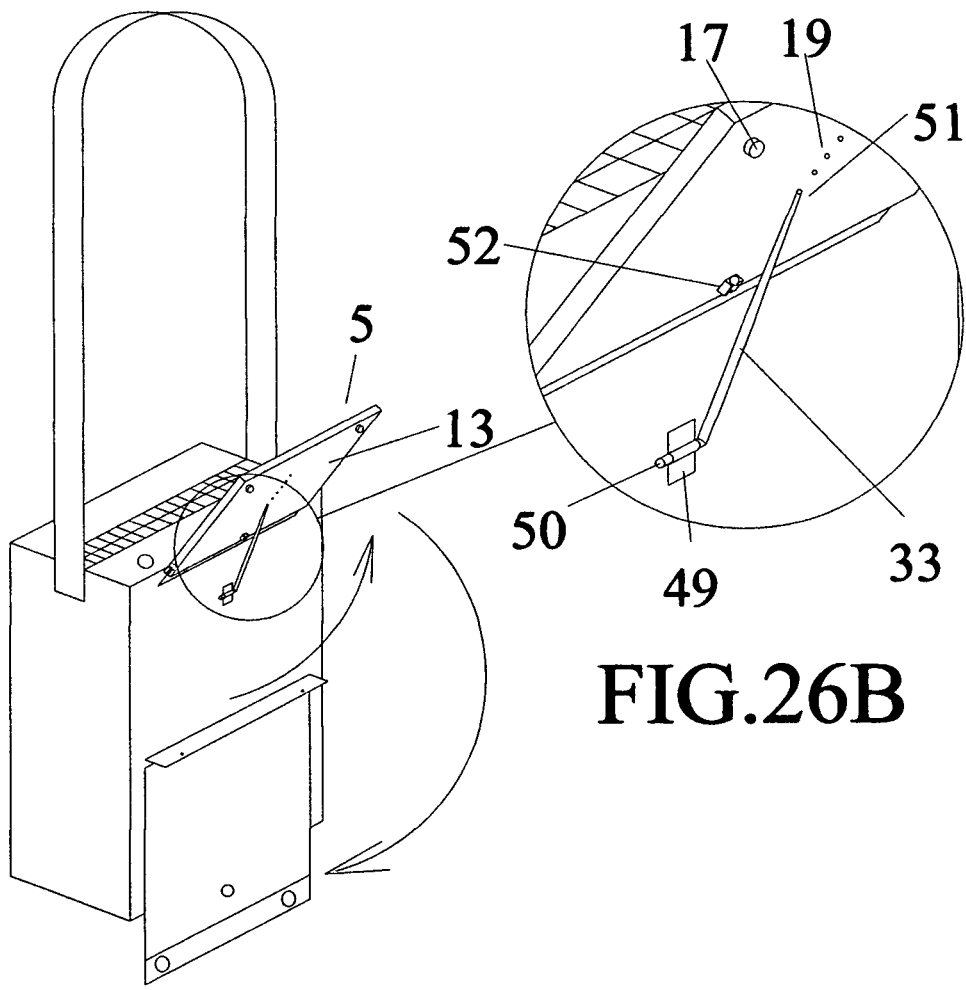
FIG. 26A This is a drawing of the bag computer with pivoting flap attachments and a display panel prop to hold up the display panel for viewing by the operator.
FIG. 26B This is a magnified view of the display panel prop base, bar and display panel back receptacles.

Shown in FIGS. 26A and 26B, the display panel prop is made for use with bag computer display panels wherein the display is on the front surface of the display panel 5 and facing up when the display panel is pivoted perpendicular to the bag front. The display panel side opposite the front surface and display is the back surface 13.

The display panel prop can come in several forms:

1) In one embodiment the prop may consist of a bar 33 mounted on a base 49 attached to the bag front so the bar can pivot on a horizontal axis. The base is attached to the bag front with sewing, riveting, screwing, etc (flap). The base may be a flap, sewn on pocket or loop of flexible/bag material 49, axle/bearing hinge, ball socket or other half hinge means that may be attached to the bag front. The proximal bar end 50, which is closest to and fits to the base, matches the base so the two are pivotally secured together. Possible proximal bar end types include an "L", "T", ball, socket, hook, axle or bearing, etc. and may have a retainer such as a snap, hook or barb to retain the bar in the base. The distal bar end 51, which is the bar end opposite the proximal end, may be a flattened or tapered end 51 and/or may be split for jamming into display back surface holes or slots, may have a hook, notch, projection or other fixtures to match receptacles on the display back surface. The bar may be made of rigid or semi-rigid material and may be removable/replaceable. One or more display back surface receptacles 19 may be inset into the display body or may project out and may jam 19, snap or hook into the matching distal bar end so that the two are removably fixed together and the display panel held in a set angular position. Several display back surface receptacles are properly spaced to prop up the display in the most commonly used positions. The display back receptacles for holding the display near vertical 52 may be difference, may be adapted to holding the display with the bar parallel to the display back surface, for example clip/snap fitting, lateral hook, split cylinder of flexible material. This vertical holding receptacle may be partially or wholly inset into the display body and/or clamp attachment on the attachment edge of the display panel. There may be molded-in prop position guides to help engage the distal bar end into the right prop position on the back of the display without looking. When no propping is needed, the bar just hangs on the bag front behind the display panel. To allow the display to lay flat against the bag front even with the prop between the display back surface and bag front, the attachment edge and/or back surface of the display panel may have elevated bumpers 17, or extended side edges or may be shaped, notched or cut away to fit the prop base, hinge and/or bar. The display back may include edges extended toward the bag front when in stored position to provide space between the display back and bag front and allow the display to lie against the bag front.

2) In an alternative embodiment, as shown in FIGS. 27A, 27B, 27C, 27D, 27E and 27F, the bar 33 is attached to a pivoting base 49 which is in turn attached to the bag front by, for example riveting or screwing. The bar passes through a display panel back receptacle which is a sliding holder 53 such as a channel, track, slot or hole parallel to the display panel back surface which is fixed to the display panel back surface 13. The bar may be semi-flexible to allow the bar to enter the sliding holder at the proper angle. The sliding holder may have a friction or ratchet surface within it so that the display panel pivots only with some force and can hold any angular position. Shown in FIGS. 28A, 28B, 29A and 29B, instead of friction, there may be a lock associated with the sliding holder 53 and the operator can engage the lock if he want the display to hold one angular position. Otherwise, the display swings freely. Examples of locking mechanisms may include a sliding switch, a button 54 or a lever 55 which can be operated conveniently from the edge of the display panel.

3) In a third means to prop up the flap mounted display panel to hold any angular position, shown in FIGS. 30A, 30B, 30C, 30D, 30E and 30F, there is a small friction hinge means attached to the bag front. The hinge means consists of a friction producing pivot point 48, a bar flange 56 and a base flange 57. The bar flange acting as the bar and extends and fits into a receptacles which is a sliding holder 53 such as a channel or groove on the display back surface 13. The sliding of the bar flange in the sliding holder allows the hinge to take up the slack caused by the flexible fabric attachment flap and allows the display to be removed from the bag. The hinge's base flange acts as a base and attaches to the bag front below the attachment flap by, for example, riveting, sewing or screwing. FIG. 31 shows the hinge means display panel prop assembly with friction pivot point 48, base flange 57 and bar flange 56.

Shown in FIG. 32, there may be more than one display panel props 14. Multiple props may be of any type and may include a lock of any sort for each prop.

The area on the bag front around the base may be reinforced, for example with redoubled material or with heavier material, so there the bag front material does not bend under the weight of the display against the prop and bag front. In the case where a computing unit is mounted to the inside of the bag's front wall, the computing unit's body may be positioned to support the prop base.

The positions of the prop base and receptacle may be reversed. For example, the base with pivoting prop may be on the display back and the matching receptacle may be on the bag front.

As shown in FIGS. 33A, 33B, 33C, 33D, 33E and 33F, the bag computer's clamp connection display panel 5 is thin and approximately rectangular in shape. The removable clamp connection display panel has a front side 58 facing up when the input device is pivoted perpendicular to the bag's front wall, a back side 13 opposite the front side, a proximal attachment edge 59 closest to the bag's front wall when the input device is pivoted perpendicular to the bag's front wall, a distal edge 60 opposite the proximal edge and two side edges 61. The display 37 is located on the display panel front side and oriented for viewing by the wearer when pivoted away from the bag's front side into operating position. The display panel may have an interior space to contain electronic equipment. The display panel may include a computing unit. The display panel may have an electrical connection 6, to electrically connect the display, manual controls and other features on the display panel with the computing unit inside of the bag.

For operation/viewing, the display panel may pivot on the bag by its proximal attachment edge using a top bag position pivoting computer equipment mount. A pivoting computer equipment mount is a fitting to removably attach the display panel and bag together while allowing them to pivot relative to each other on a horizontal axis. It consists of one part on the display panel proximal attachment edge 32 and a matching part on the bag. Instead of one pivoting computer equipment mount there may be right and left pivoting mounts on the same axis. The pivoting computer equipment mount may be, for example; an axle bearing hinge on either the display panel or bag matching an complimentary attachment and hold the display panel and bag together, a half hinge bearing or axles with one half hinge on the display panel and the other matching half hinge on the bag; a flexible fabric attachment flap on the bag or display panel proximal attachment edge of a size shape and thickness to match a complimentary attachment, such as a clamp, and hold the display panel and bag together; a flexible fabric attachment flap on the bag or display panel proximal attachment edge with an attachment which matching a complimentary attachment and hold the display panel and bag together.

The front side of the display panel may have a small keyboard, electronic write pad, pointing device, scroll buttons or bar, speaker, microphone or other controls in addition to the display. The display may have a touch screen. On the side of the computer opposite the display there may be a pointing device, such as a touch pad, or other controls. The back side touch pad may have one or more finger guides over a touch pad to help align the operator's fingers to the touch pad without looking. The finger guides may be removable. The finger guide has a pattern of ridges and/or openings to guide the fingers to specific positions, corresponding to specific controls, on the touchpad which is underneath the finger guide. The finger guides may work with and align to programmed touchpad positions. The finger guide and programming for the touchpad may be changed together to fit particular operator needs. Bumpers may be built into the forger guides to cushion the blow if the display panel is dropped against the bag front. The display, if including a computing unit, may have batteries and be self-contained. There may be television, music player, radio, telecommunications and/or GPS. There may be additional plugs for data transfer, charging, earphones or other peripherals. The panel may have a general use input/output tool such as an infrared antenna 64 for external communication, or camera 65 located at its distal end or back side so it can be pointed to an external target. There may be a separate infrared antenna for communication with a keyboard or electronic write pad mounted on the bag front. Other controls such as a scroll mechanism/wheel may be located on the side edges.

The display panel may be tapered to be thinner and lighter at the distal end and may have heavier components, such as batteries, if present, near the bag. The display panel and attachments may be shaped to allow the panel to lay flat against the bag even if there is some bag bulge caused by cargo in the bag. Shaping may include recesses or protrusions to compensate for the thickness of the display panel prop on the bag front or to protect the display panel backside controls.

To further divide the bag computer system into components, the display panel may be divided into two parts along a plane parallel to the front and back sides. The front side 67 part would include the display and the back side part 68 would include a touch pad or other pointing device and/or controls and may include finger guides to assist the operator find particular touch points on the controls. The front display and back controls face outward when the two parts are assembled so they may be used. The two parts may be changed/replaced whenever desired. The two parts may be attached with attachments such as a hook 69, plug or socket at the distal edge and using the proximal attachments, for example a clamp, which may both connect the two halves and attach the display panel to the bag attachment flap. Instead, snaps, clips or sliding channels may be used to attach the two parts. The two parts may be attached using a finger guide frame which both holds the finger guide in place and may also hold the two display panel parts together. The finger guide frame may be part of the finger guide or a separate part and it holds the perimeter of the finger guide to the edges of the display panel parts.

The display panel may be electrically connected through the bag and its front wall to the interior so that it may be removably connected with other peripheral or the computing unit.

In the case where the computing unit is meant to be mounted elsewhere in the computer bag, the display panel may be linked to other equipment in the bag with an electrical connection 6. Electrical wiring and plug may be part of the bag or computing unit panel with the display panel having a plug to match it.

Alternatively, the electrical connection may be a wire 6 of an appropriate diameter and length, including plug, from the proximal attachment edge of the display panel, through the clamp attachment area so that it may passing through an opening in the front wall of the bag and connecting with computer equipment mounted inside the bag. The wiring may be designed to pass through two layers of attachment flap material and through the front wall to the bag's interior. There may be a gap, channel, notch or other cut out 11 in the display panel's clamp attachment area to allow an electrical connection, for example a wire with plug 62 at the end, to pass from the display panel proximal attachment edge, between the clamp jaws, through an opening in two layers of the bag's attachment flap, through the bag's front wall and to the interior of the bag to connect with inside mounted computer or peripherals without pinching the wire in the clamp when it is tightened around the attachment flap. By using a wires and plug that is part of the display panel, no wiring need be included in the bag thus simplifying bag construction. A wire leading from the display panel proximal attachment edge may be positioned anywhere to match the opening in the bag's attachment flap and the electrical connection on an inside mounted computing unit.

If the display panel is divided into two parts, each part may have an electrical connection, such as a wire and/or plug or there may be a connecting plug between the two panel parts and just one wire and/or plug leading into the bag.

In the case where the display panel is meant to be a self contained computer, the computing unit, batteries and other essential equipment may also be located in the display panel with an electrical connection, as described above, for peripherals being optional.

Figure 34A:
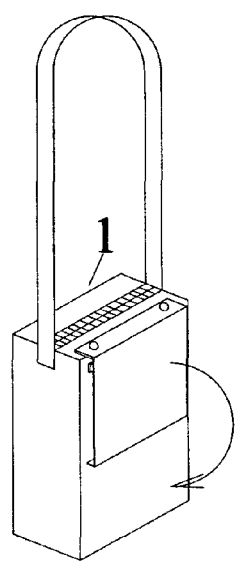
FIG. 34A This is a view of the bag computer with the cover closed and the equipment stored.
Figure 34B:
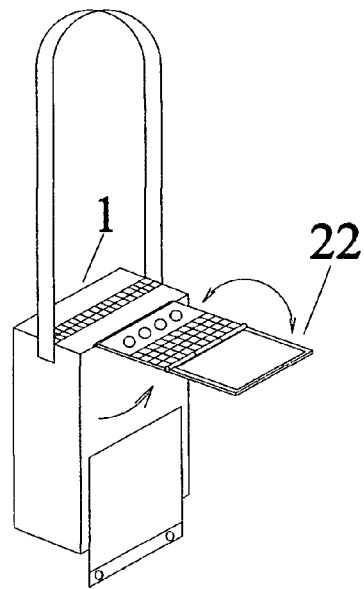
FIG. 34B This is a view of the bag computer with the cover open and the two panel computer unfolded and pivoted out for viewing and operating.
Figure 34C:
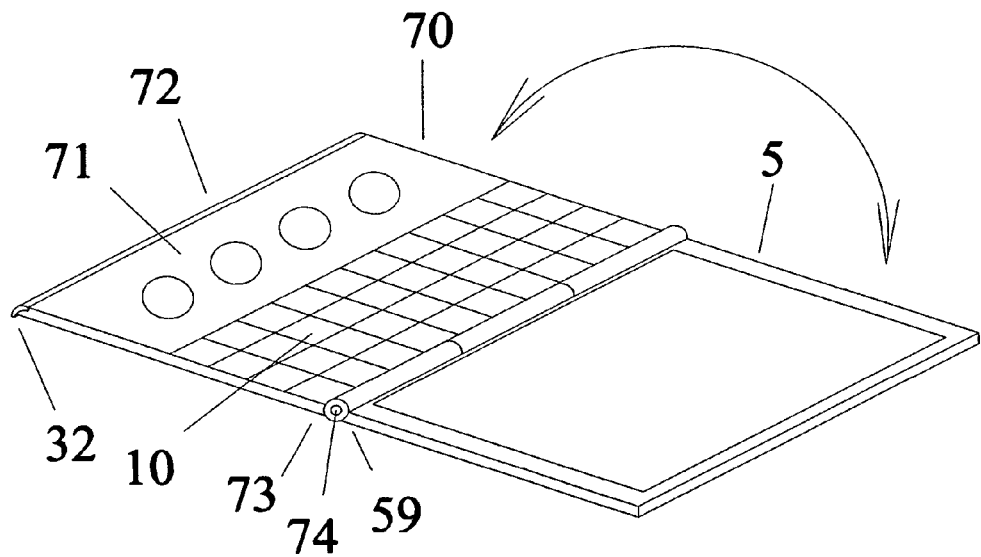
FIG. 34C This is a magnified view of the two panel computer for bag computer use with a display panel and intermediate panel including computing equipment and keyboard.

As shown in FIGS. 34A, 34B and 34C, the display panel may become a two panel computer by placing an intermediate panel 70 between the display panel 5 proximal edge clamp attachment 32 and the display panel proximal edge 59. The intermediate panel has front side 71 facing up when the intermediate panel is pivoted perpendicular to the bag's 1 front wall, an opposite back sides, two side edges, a proximal attachment edge 72 nearest the bag front when installed and an opposite distal edge 73. The proximal edge attachment matching the bag is fixed to the intermediate panel proximal attachment edge. The intermediate panel distal edge is pivotally attached to the display panel proximal edge using a hinge means 74. The intermediate panel may hold a computing unit and/or may have a manual input device such as a keyboard 10 or electronic write pad or other controls on its front side.

There may be a pointing device on the back side of the display panel. The front side of the display panel and front side of the intermediate panel may face each other when the two panels are folded together while in stored position. The result is computer with a display panel and keyboard/computer panel connected with a hinge means in a manner similar to a small lap top computer and with a clamp attachment matching the bag attachment flap found on the edge of the keyboard/computer panel opposite and not adjacent to the edge with hinge means. The clamp attachments are the same as described below for the display panel alone.

There is an electrical connection between the intermediate panel and the display panel and this passed through the hinge means that connects them. There may be an electrical connection leading from the intermediate panel proximal edge through the intermediate panel clamp and bag attachment flap and bag front wall to the interior of the bag to removably connect with computer equipment held there. Its characteristics are the same as described for a display panel alone.

Figures 35A, 35B:
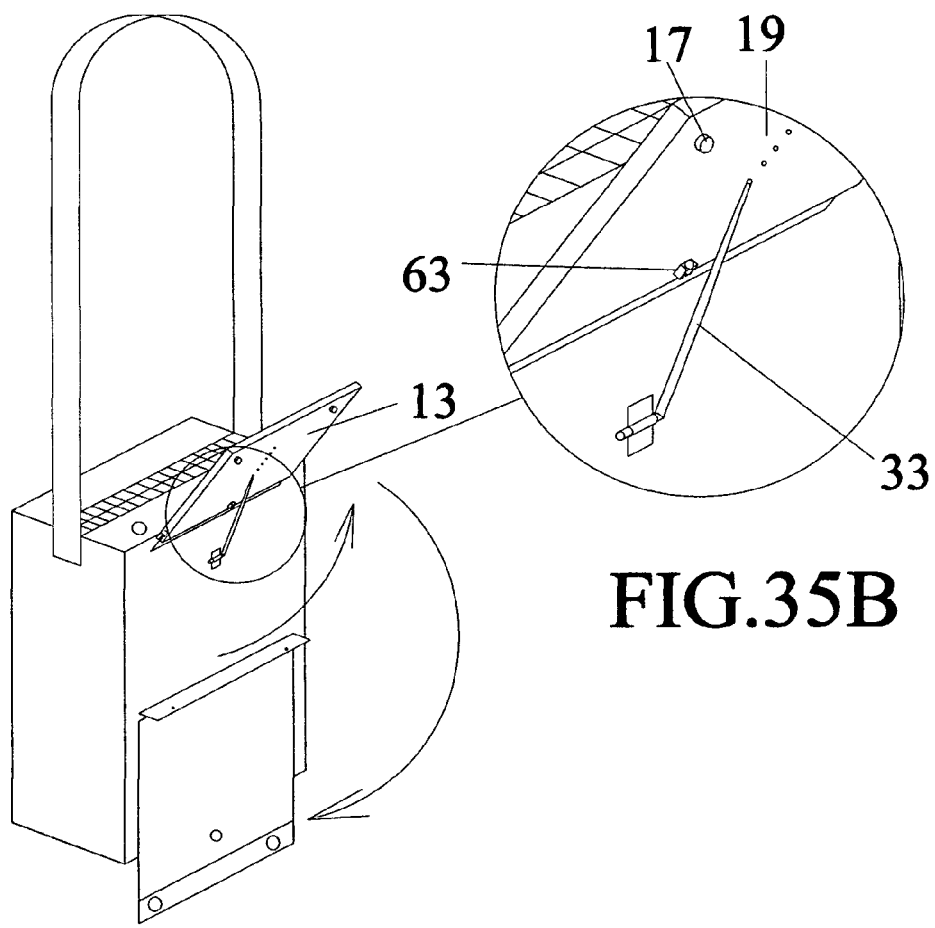
FIG. 35A This is the bag computer with the display panel pivoted so that the display panel prop with display panel back side receptacles and bag front prop base are visible.
FIG. 35B This is a magnified view of the bag prop area of the bag computer.

Shown in FIGS. 35A and 35B, one or more display panel back side 13 display prop receptacles 19 may be inset into the display panel or may project out and may jam 19, snap or hook into a matching display panel prop bar 33 end so that the two are removably fixed together and the display panel held in a set angular position. Several display back fixtures are properly spaced to prop up the display in the most commonly used positions. The display back fixtures for holding the display near vertical 63 may be different and may be adapted to holding the display with the bar parallel to the display back side. This vertical holding fixture may be partially or wholly inset into the display panel and/or clamp. The display back side prop fixtures may be part of the finger guides or part of a finger guide frame that removably attaches to the display panel and may hold the pointing device part and display part of the display panel together. When no propping is needed, the bar just hangs on the bag front behind the display panel. To allow the display to lay flat against the bag front even with the prop between the display back and bag front, the proximal attachment edge and/or back of the display panel may be shaped, notched or cut away to fit the prop base, hinge and/or bar. The display back may include one or more bumpers 17 or perimeter edges extended toward the bag front when in stored position to provide space between the display back and bag front for a display prop or to protect controls and allow the display to lie against the bag front. These may also cushion the blow if the display is dropped against the bag front.

Alternatively, the prop bar may pass through a sliding holder such as a channel, track, slot or hole parallel to the display panel back side which is fixed to the display panel back side. The sliding holder may have a friction or ratchet surface within it so that the display panel can hold any angular position. Instead of friction, there may be a lock associated with the sliding holder and the operator can engage the lock if he want the display to hold one angular position.

The positions of the prop and sockets/channel may be reversed. In other words, the prop bar may be on the display back and the matching sockets or channel may be on the bag front.

One of the simplest means to pivotally attach the display panel to the bag front is to use a clamp on the proximal attachment edge of the display panel to clamp onto one or more short flexible fabric attachment flaps or pivoting flange on the bag. The clamp attachment also provides a thickened and reinforced area on the edge closest to the bag front and the one most likely to be stressed. The attachment flap may be short and about the width of the display panel so as to match the clamp in terms of shape, length, width and thickness. To match and removably secure to the flap, the clamp jaws are adapted to fit a plain surface such as a flap. The clamp jaws may match the curve of a flexed plane, such as is formed when a flap is bent, so that the clamp may fit best with the shape of the top front corner of the bag when installed. The clamp jaws may be angled to best fit the shape of the top front corner of the bag and/or extended away from the display panel's back side surface plane to allow the display to lay flat against the bag front even if there is a display prop on the bag front or if the bag has bulge from cargo carried in the bag. The clamp jaws may have features, such as pins or ridges, matching the attachment flap.

Figures 36A, 36B:
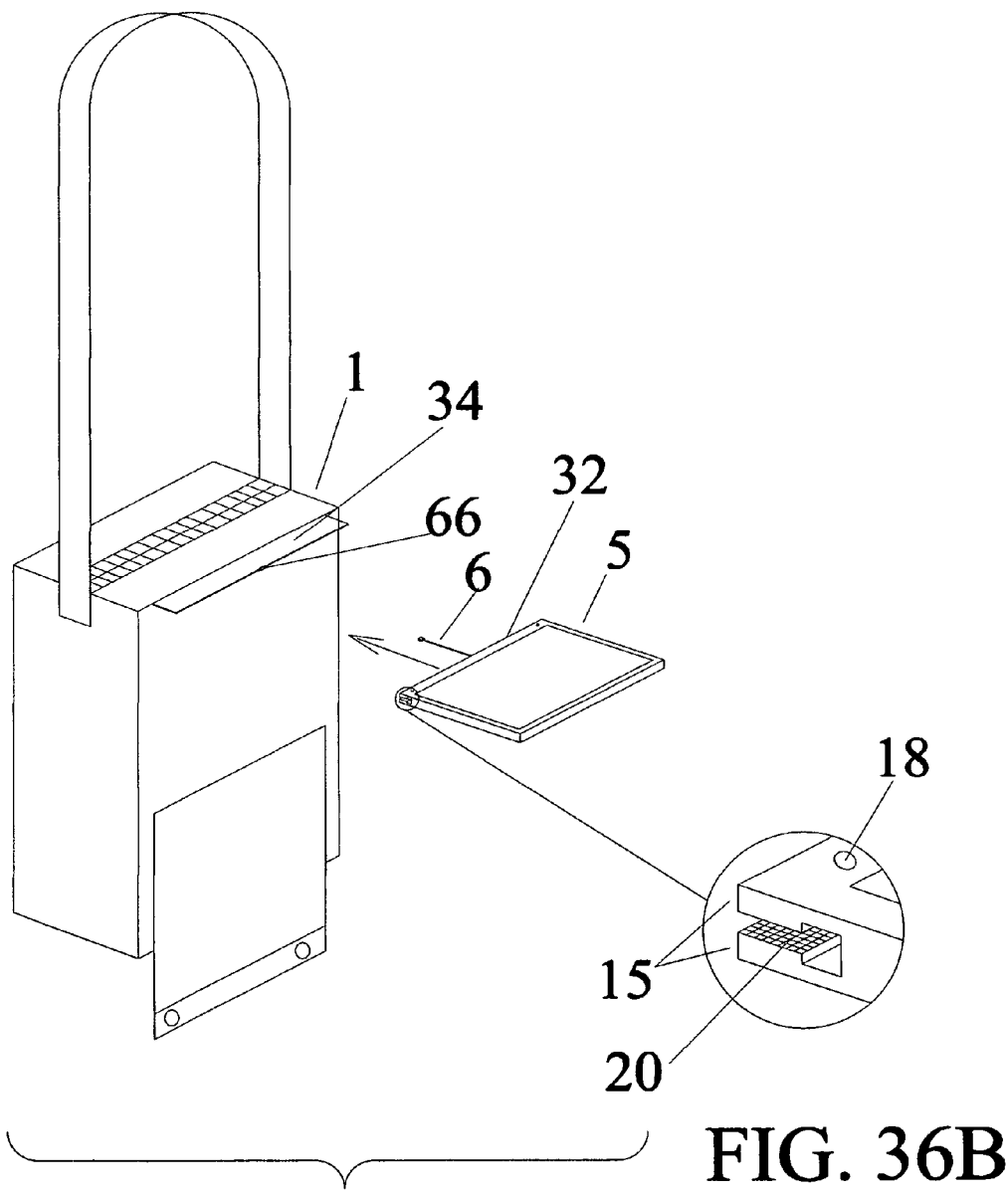
FIG. 36A This is the bag computer with short flexible fabric attachment flap on the bag and clamp connection to match it on the display panel's attachment edge. The electrical connection is also visible.
FIG. 36B This is a magnified view of the display panel clamp connection area with clamp jaws.

As shown in FIGS. 36A and 36B, the display panel portion of the pivoting computer equipment mount holding the display panel 5 to the bag 1 may consist of one or more clamp attachments 32 on the proximal edge. The clamp has two jaws 15 between which the bag's portion of the pivoting computer equipment mount, such as short flexible fabric attachment flap 34 or flange from a hinge means, is clamped. The jaws may be tightened with a clip, screws or other fastener means 18. As shown in FIG. 36B, the jaws may be made of one molded piece with a fastener to tighten the jaws around the bag's attachment flap. The clamp should be made of a material flexible enough to bend and clamp when fastened. The bag's pivoting mount would usually be a flexible fabric attachment flap so it can easily be sews or riveted to the bag front. There may be a gap, channel, notch or other cut out in the clamp area to allow an electrical connection 6, for example a wire with plug at the end, to pass from the display panel proximal attachment edge, between the clamp jaws, through an opening 66 in two layers of the bag's attachment flap, through the bag's front wall and to the interior of the bag to connect with inside mounted computer or peripherals without pinching the wire in the clamp when it is tightened around the attachment flap.

Figures 37A, 37B:
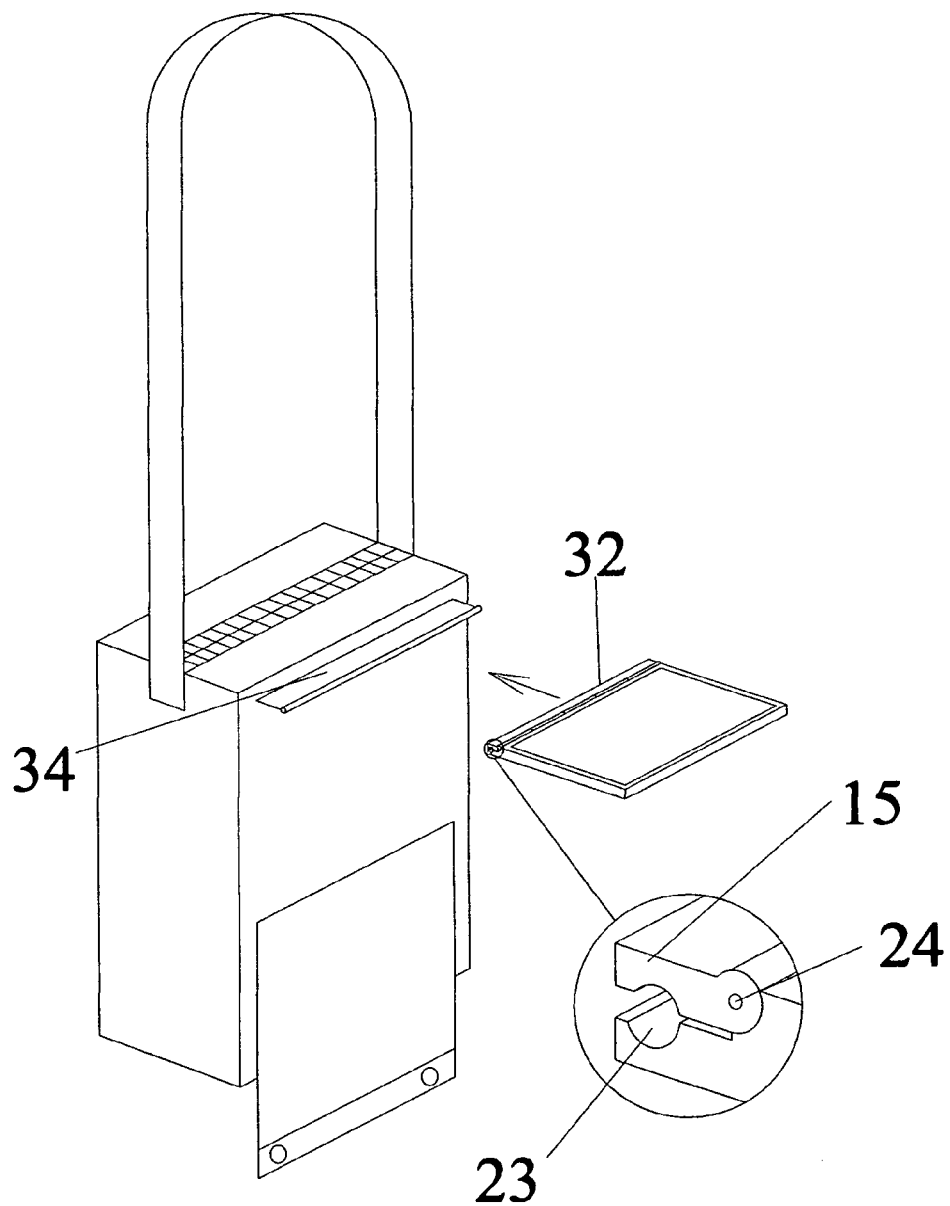
FIG. 37A This is another version of the bag computer with clamp connection wherein the attachment flap has a thickened distal edge to match the display panel clamp jaws.
FIG. 37B This is a magnified view of the display panel clamp connection area with a channel in the pivoting clamp jaws to match the bag's attachment flap.
Figure 38:
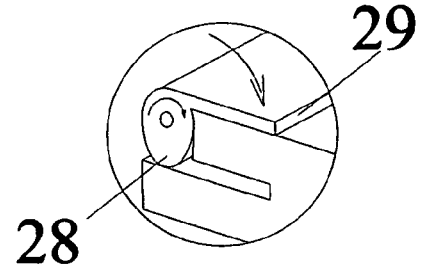
FIG. 38 This is a magnified view of the display panel clamp connection area with an alternative clamp jaw arrangement having a levered clamp.

As shown in alternative jaw configuration, FIGS. 37A and 37B, the proximal edge clamp attachment 32 may also have two separate jaws. One or both of these jaws 15 may be hinged 24 together so they can be opened to accept the bag's attachment flap 34. The jaws may have a spring to hold the jaws closed. Screws, bolts, releasable clips, pins, snaps or other fasteners may be included to hold the jaws closed and there may be release buttons which may be recessed to avoid accidental release. Shown in FIG. 38, in an alternate jaw form, one of the jaws may be a pivoting cam jaw or other eccentric pinch bar with a lever to jam and clamp the attachment material. To tighten and lock the jaws in place at the same time, the clamp has a longer lever 29 for tightening and a short lever or cam apogee 28, at an angle of about 90 degrees from the long lever, which pinches the clamped material against the other clamp jaw when the long lever is pivoted. This type of clamp allows installation without the use of a tool.

Figures 39A, 39B, 40, 41:
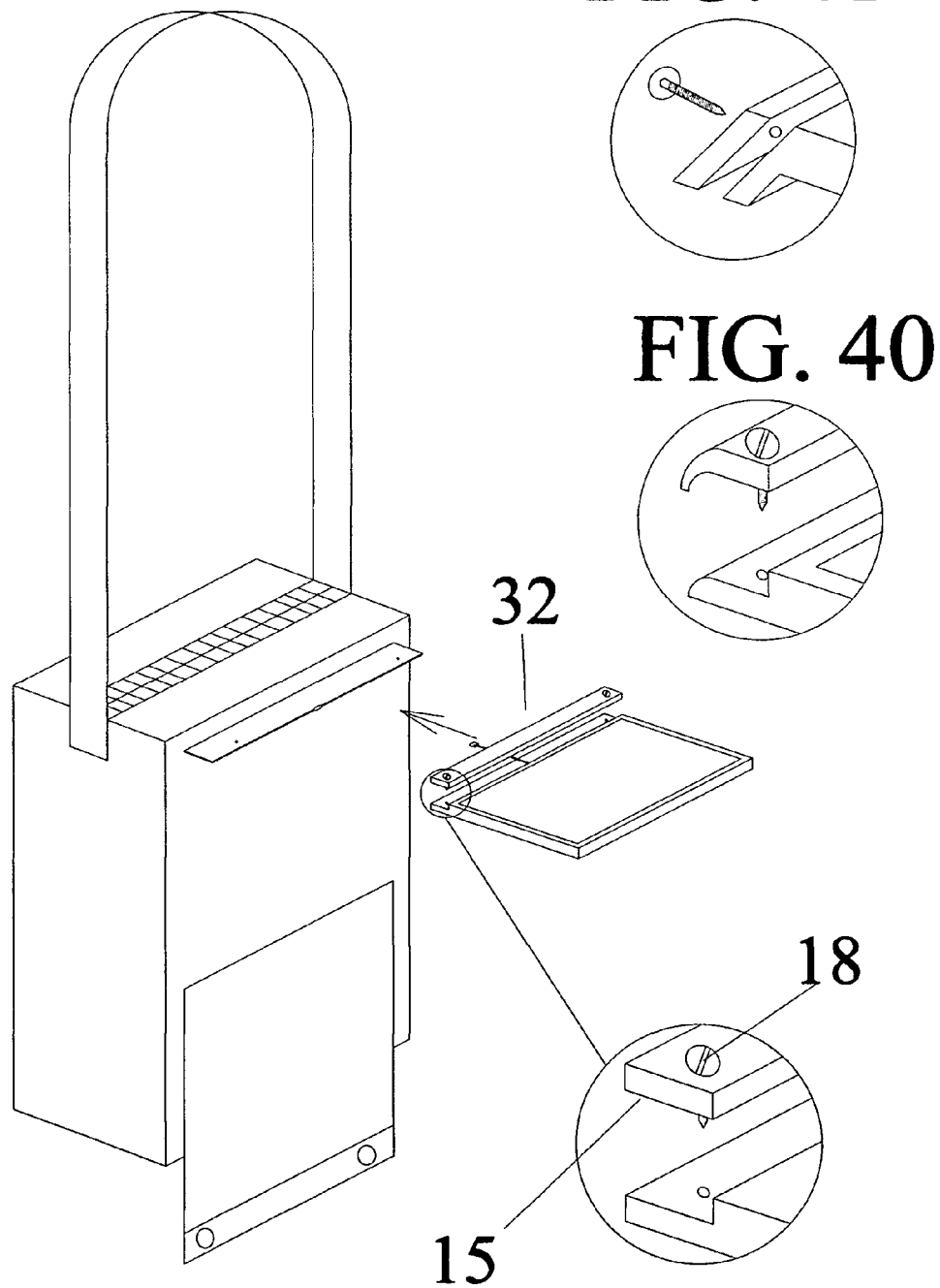
FIG. 39A This is another version of the bag computer with clamp connection wherein one of the clamp jaws is removable.
FIG. 39B This is a magnified view of the display panel clamp connection area with one of the jaws being removable.
FIG. 40 This is a magnified view of an alternative display panel clamp connection area with one of the jaws being removable and curved.
FIG. 41 This is a magnified view of an alternative display panel clamp connection area with one of the jaws being removable and angled with an extension.

As shown in alternative jaw configuration, FIGS. 39A and 39B, the proximal edge clamp attachment 32 may have one removable jaw 15 and this may be tightened to the other jaw with screws, bolts, releasable clips, pins, snaps or other fasteners 18. FIG. 40 shows an alternative jaw configuration with the jaws curved to best fit the shape of the top front corner of the bag. In this arrangement, applicable to all display clamp attachments, the clamp jaws match the curve of a flexed plane such as is formed when a flap is bent. FIG. 41 shows that the clamp area may be angled and/or extended away from the panel to best fit the shape of the top front corner of the bag, to provide space behind the display and/or assist in making the display panel lay flat against the bag front.

The inside of the clamp jaws may be shaped to match the bag's attachment flap. The jaws may form a channel FIG. 6B 16 to match a bar, rope or thickened hem or other ledge on the attachment flap edge. The jaws may have knurling FIG. 5B 20, teeth or ridges to grip a plain flexible fabric attachment flap. The jaws may have matching projections and sockets/holes to match perforations in the bag's attachment flap.

Instead of one broad clamp attachment, there may be two clamps, one on the right and one on the left sides of the display panel's proximal attachment edge. Each clamp may have the same attributes, including the electrical connection, as a single attachments flap, as described above. Two attachments may have improved characteristics while holding cargo which makes the bag front bulge.

As shown in FIGS. 42A, 42B and 42C the bag computer manual character input device (MCID) 9, cover and/or receptacle is pivotally mounted to the bag 1 front 8 by attaching it either to a bottom bag position pivoting computer equipment mount or to the inside surface of the bag's cover flap 3. To allow the input device to be replaceable, upgradeable or to change type it is designed to be removably fixed to the bag. The MCID and cover flap may pivot up into stored position to cover and protect the bag's display panel 5 stored on the bag's front wall. As shown in FIGS. 43A, 43B and 43C, the MCID and cover flap may be pivoted down to expose the computer equipment. The manual character input device cover and/or receptacle may be a cover for the bag's display, a receptacle for accepting an input device insert, a keyboard, an electronic write pad or other electronic device used to manually input information to the bag computer. FIG. 43C, magnified in FIG. 44, shows that, in this case, the MCID 9 is pivotally attached to the bag 1 front with an attachment flap 34 on the bag front and clamp jaws 15 on the MCID attachment edge while the cover flap 3 is separately attached to the bag front.

As shown in FIGS. 45A, 45B, 45C, 45D and 45E, the manual character input device is thin and approximately rectangular in shape. The general shape of the device may be called its body. It has a front surface 39 facing up when the input device is pivoted perpendicular to the bag's front wall, a back surface 40 opposite the front surface, a proximal attachment edge 41 closest to the bag's front wall when the input device is pivoted perpendicular to the bag's front wall, a distal edges 42 opposite the proximal attachment edge and two side edges 38. In the case where the input device is attached directly to the bag's front wall by its back, the proximal attachment edge is the one nearest the top of the bag and the operator's face when mounted to the bag. The manual interface with the operator, such as keys, is located on the front surface of the input device. The input device may have a general use input/output tool such as an infrared antenna 64 or camera 65 located at its distal end or back side so it can be pointed to an external target. Electrical plugs for peripherals may be included. Communication with the bag computer may be by proximal attachment edge electrical wire or wireless antenna. On the back of the input device there may be other controls associated with operating the bag computer, camera, external communicator or other built in input/output tool. Input devices with single edge attachments may have a cover flap to input device/cover attachment 36 on the back surface or other surface matching the cover flap so that they may both move together when shifted from the stored to operating positions.

If the manual character input device is a keyboard 10, it would be oriented for use from above by the wearer. It may be ten keys wide and this allows for full size keys for typing while still keeping the keyboard size proportional to the average bag. The keyboard would be the width of the keys "a" to ";" on a standard QWERTY keyboard. Three or four rows may be included. Thumb keys substitute for essential keys farther to the right and left on the standard keyboard (eg. space, return, shift, backspace, tab, change keyboard, camera or external communicator controls, etc). The result is a keyboard with standard ¾ inch keys and totaling about 8" wide. The key rows may have the standard offset or be inline. Alternative key placement or other controls may be programmed with software.

To make the keyboard easier to use without looking, tactile finger guides such as vertical thumb troughs, vertical finger ridges between the keys, depressions and/or outer edge palm ridges, may be included to assure finger position and to help stabilize the keyboard with the hands/palms.

To make the keyboard weatherproof, easier to clean, easier to use in the vertical position and without looking, it may have a continuous weatherproof surface with depressions for each standard size key. Small actuating buttons, pegs or cones may be at the bottom of each depression. These would be easier to use in the vertical position because they can be pushed down, in or up to be actuated.

The manual character input device may be electrically connected through the bag and its front wall to the interior so that it may be removably connected with other peripheral or the computing unit. Electrical wiring and plug may be part of the bag or computing unit panel with the display panel having a plug to match it. Instead, the electrical connection may be a wire and plug 6 of an appropriate diameter and length (including any plug) leading from the proximal attachment edge of the manual character input device, through or next to the clamp attachment 32 so that it may passing through an opening in the front wall of the bag and connecting with computer equipment mounted inside the bag. The wiring may be designed to pass through two layers of attachment flap material and through the front wall to the bag's interior. The wire may lead through the clamp jaws 15 of a clamp attachment on the manual character input device proximal attachment edge. There may be a gap, channel 11, notch or other cut out in the manual character input device's clamp area to allow an electrical connection, for example a wire with plug at the end, to pass from the manual character input device proximal attachment edge, between the clamp jaws, through an opening in two layers of the bag's attachment flap, through the bag's front wall and to the interior of the bag to connect with inside mounted computer without pinching the wire in the clamp jaws when they are tightened around the attachment flap. By using a wires and plug that is part of the manual character input device, no wiring need be included in the bag thus simplifying bag construction. A wire leading from the MCID or MCID receptacle proximal attachment edge may be positioned anywhere to match the opening in the bag's attachment flap and the electrical connection on an inside mounted computing unit.

The input device may, alternatively, have its own power source and equipment to broadcast input/output information to/from its computer via wireless radio or line-of-sight (infrared) broadcasting. An infrared antenna may be located near the proximal attachment edge of the input device so that it may broadcast up toward the display back, computer body, computer hinge or, if present, turning lens on the bag front which may direct the signal to the body of the computer inside the bag. This antenna may also receive/broadcast information for transfer through the input device to a distally mounted input/output tool 64. The antenna's signal angle may be fanned vertically so that the input device may be used when pivoted in either the vertical or horizontal position. The associated batteries, antennas, modem and broadcasting equipment would be included.

The manual character input device may store over the display and it may be defined by structures to align the keyboard to the display panel and computer, if present, to protect the display/computer while stored. These structures may be on any edge or the front of the input device and may include ridges or pins on the input device edges, may be wedged so to form a snug fit against the display and may include spacers to keep the keys from being depressed when stored. The structures may be molded into the input device body. Including the input device, they may form a box-like enclosure open on one side (the display side). The alignment structures may also touch the bag's front wall or display/computer hinge while closed to serve to protect the display from impact. They may be made of a material softer than the display so as to not scratch it. The alignment structures on the input device sides may include cut outs (option shown in dotted line) to allow easier access to the keys by the hands. There may be one or more clips, snaps, hooks or other fasteners to secure the input device to display/computer.

Alternatively, the manual character input portion of the device may be missing from the body. The body with appropriate size, shape and alignment structures may then form a pivoting molded cover to protect the display.

As shown in FIGS. 46, 47 and 48, the manual character input device may be in the form of a molded cover 4 with a receptacle 21 to accept and hold a input device insert 47 such as a keyboard (FIG. 47), as described above, or electronic write pad (FIG. 48). In this way the cover can be bare, to reduce weight, have a keyboard, have an electronic write pad or have some other removable/exchangeable manual input device. Changing input device inserts can be done without dismounting the cover/receptacle from the bag. The molded cover has a clamp attachment 32 on the attachment edge to physically and pivotally connect the cover to the bag. The cover may have the electrical connection to the bag interior, such as a connecting wire and plug 6. Associated with the receptacle there may be the electrical connection (hidden) to match the removable input device insert. The molded cover may have one or more appropriate attachments 43 to match and physically hold the input device insert in the receptacle. This may be a clip sprung by the flexing of the cover material, or may have some other latch as appropriate to keeping the weight low, insuring a secure hold and allowing the input device insert to be installed or removed easily. The input device insert would fit the receptacle and have one or more matching attachments 46 and may be partially or totally enclosed in it own casing. The input device insert would have an electrical connection 125 to match the receptacle.

The MCID, cover and/or receptacle may be attached to the inside surface of a fall down cover flap so that it overlays and covers the display and computer equipment storage area when pivoted up and exposes the MCID, cover and/or receptacle for use when pivoted downward. The MCID, cover and/or receptacle may be permanently attached to the inside surface of the cover flap by, for example, riveting or attaching through to a backing plate or may be removable attached using a docking port, complimentary fittings or other suitable attachments.

Instead, the manual character input device, cover and/or receptacle may pivot on the bag by the proximal attachment edge so that the input device front surface faces away from bag front and the manual interface is available for use when the input device is pivoted into operating position. This pivoting may be accomplished by having an attachment on the proximal attachment edge matching the bag's pivoting computer equipment mount, in this case an attachment flap. If the manual character input device is a cover with removable input devices, the attachment would be located on the cover.

Figure 49A:
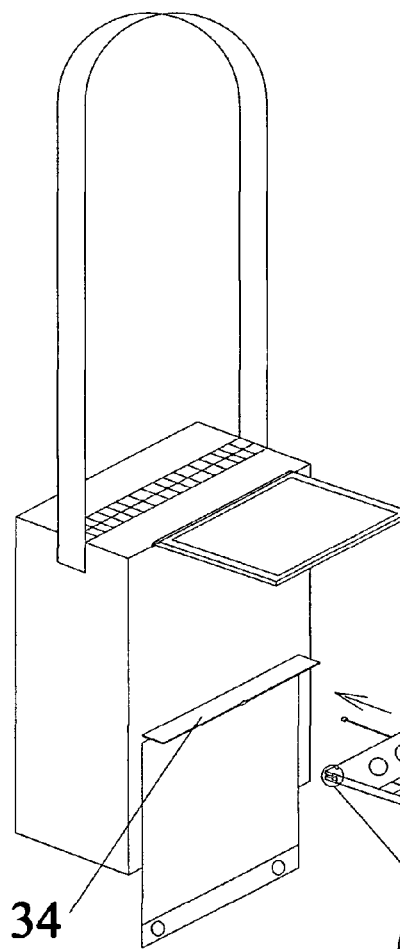
FIG. 49A This is the bag computer bag with attachment flap and manual character input device with clamp attachment on its proximal attachment edge fitting the flap.
Figure 49B:
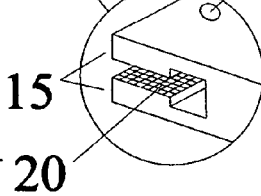
FIG. 49B This is a magnified view of the manual character input device clamp attachment with flexible molded jaws.

As shown in FIGS. 49A and 49B, the attachment holding the manual character input device 9 to the bag may consist of a clamp on the proximal attachment edge 41. The clamp on the input device allows the bag to be simpler by attaching the clamp to a short flexible fabric attachment flap on the bag front. The clamp has two jaws 15 between which the bag's matching hinge means, such as flexible fabric attachment flap 34, or flange from a bag's hinge means is placed. The jaws may be tightened with a clip, screws or other fastener means 18. The jaws may be made of one molded piece of semi rigid material with a fastener to tighten the jaws around the bag's hinge means. The hinge means would usually be a flexible fabric attachment flap so it can easily be sewn or riveted to the bag front wall.

Figure 49C:
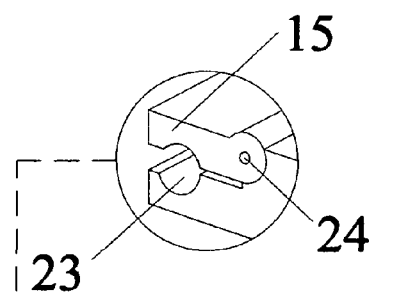
FIG. 49C This is a magnified view of the manual character input device clamp attachment with one hinged jaw.

As shown in alternative jaw configuration, FIG. 49C, the clamp may also have two separate jaws. One or both of these jaws 15 may be hinged 24 together so they can be opened to accept the bag's hinge means. The jaws may have a spring to hold the jaws closed. A clip or other fasteners may be included to hold the jaws closed and there may be one or more release buttons which may be recessed to avoid accidental release.

Figure 49D:
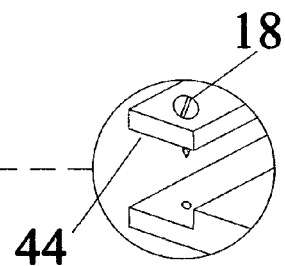
FIG. 49D This is a magnified view of the manual character input device clamp attachment with one removable jaw.
Figure 49E:
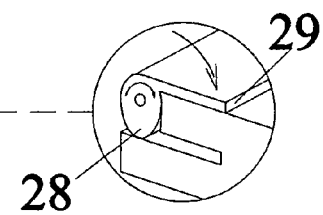
FIG. 49E This is a magnified view of the manual character input device clamp attachment with a double lever clamp jaw.

Shown in FIG. 49E, in an alternate jaw form, one of the jaws may be a pivoting cam jaw or other eccentric pinch bar with a lever to jam and clamp the attachment material. To tighten and lock the jaws in place at the same time, the clamp has a longer lever 29 for tightening and a short lever or cam apogee 28, at an angle of about 90 degrees from the long lever, which pinches the clamped material against the other clamp jaw when the long lever is pivoted. This type of clamp allows installation without the use of a tool.

As shown in alternative jaw configuration, FIG. 49D, the clamp may have one removable jaw 44 and this may be tightened to the other jaw with screws, bolts, releasable clips or other fasteners 18.

The inside of the clamp jaws may be shaped to match the bag's hinge means. The jaws may form a channel, FIG. 49C 23, to match a bar, rope, thickened hem or other ledge on the hinge means edge. The jaws may have knurling FIG. 49B 20, teeth or ridges to grip a plain flexible fabric hinge means. The jaws may have matching projections and sockets/holes to match perforations in the bag's hinge means.

There may be two attachments on or near the proximal attachment edge, one near the right and one near the left sides of the input device's proximal attachment edge. The attachments may be molded into the input device body or separate attachments may be secured to it. The two edge attachments may be clamps as described above including the electrical connection.

The bag computer system may have a computing unit which matched and connected to the bag and other system components. It may be independent and detachable from the other components so it can be easily replaced without replacing other system components. As a combination of components, a bag computer of this type may increase the diversity of available component manufacturers to the advantage of the consumer.

Shown in FIGS. 50A and 50B, the computing unit panel 25 size and shape and/or attachments found on it are designed to fit a mounting structure found on the inside surface 75 of the bag's front 8 and/or top walls 2. The mounting structure may be a holster, holster 30 and flap 76, array of attachments or docking port of any sort which matches the computing unit panel and physically holds and aligns it to the inside of the bag's front wall, equipment mounted on the outside of the front wall and the provisions on the bag for electrical connections.

The computing unit panel 25 may consist of a body that is panel shaped so that it may act as a rigid support for the bag's front wall and render flat the computer equipment storage area 26 on the outside of the bag's front wall so that the display and manual character input device may pivot easily and store flat against the bag front. Shown in FIG. 51, the computing unit panel has a front side adjacent to the bag's front wall when installed, an opposite back side 77, a top edge 78 nearest the bag's top when installed, an opposite bottom edge and two side edges 79.

The computing unit panel has electrical connections for the outside mounted computer equipment such as a display and manual character input device, and other equipments which may be held in the bag such as auxiliary batteries, peripherals.

On any side or edge near the top of the computing unit panel there may be a display panel electrical connection 80, such as a plug or wire and plug, situated to connect and align with and designed to match the outside mounted display panel or an electrical wire leading from it. The computing unit panel may include a recessed area 87a such as a groove on its top or side edge to accommodate the electrical wire or plug so that the electrical wire has room for slack so it will not break under stress and so that the body shape is not substantially changed with or without the electrical connection in place.

On any side or edge near the bottom of the computing unit there may be a manual character input device electrical connection 81, such as a plug or wire and plug, situated to connect and align with and designed to match the outside mounted manual character input device or an electrical wire leading from it. Alternatively, the electrical connection may be located near the display panel electrical connection to simplify installation. The computing unit panel may include a recessed area 87b or groove on its top, bottom or side edge to accommodate the electrical wire or plug so that the electrical wire has room for slack so it will not break under stress and so that the body shape is not substantially changed with or without the electrical connection in place. Side recessed areas and its plug may be configured to make the computer equipment wires bend about 90 degrees to provide slack in the connection.

Since the bag computer is meant for mobile use, "instant on" capability would be desirable. Instant on programming allows the computer to function within a few seconds and may not need to access any disk memory. To allow instant on, the computer may be provided with a very small "introductory operating system" which can load itself and an interactive choice of options shown in a picture on the display. The options may include starting Windows or some other "normal" operating system, starting television, starting telephone messaging or starting one or more programs located on removable memory inserts such as flash memory sticks. The removable memory may contain maps, pictures, reference material or other information along with very simple and quick loading program to access this information.

Hence, the computing unit panel may have one or more memory receptacles 82 for removable memory 83. The receptacles may be oriented to plug in from the top so that the thinnest dimension of the removable memory, its plug and memory receptacle match the thinnest dimension of the computer. Inserting the memory from the top also facilitates its installation. The receptacles may be slots, sockets or recessed areas in the computing unit panel so that the body shape is not substantially changed with or without the removable memory in place.

There may be additional plugs 84 for batteries, peripherals, such as earphones or microphone, or other controls of any sort on the computing unit panel back side, top, bottom or side edges. The plugs may be aligned and positions to match lining fixtures such as pockets, holding straps or wire covers found on the inside surface of the bag.

The computing unit panel may have one or more sound outlets 85 on its top edge. The sound outlets may be associated attachments 86 to secure the outlet to complimentary attachments on a matching opening in the bag's top wall. The attachments may be snaps or channels and may be one or more attachments or may form a perimeter around the speaker outlet. The speaker outlets may form a seal between the computing unit and the bag and this seal may form part of an assembly which includes the attachments.

The preferred embodiments of the invention described herein are exemplary and numerous modifications, variations, and rearrangements can be readily envisioned to achieve an equivalent result, all of which are intended to be embraced within the scope of the appended claims.

The invention claimed is:

1. A portable computing apparatus comprising:
   a. a bag comprised of a front wall, an inside surface, and an outside surface;
   b. a computer equipment storage area, including a top and a bottom, on the outside of the bag front wall;
   c. a display panel comprising a front side, a back side, an attachment edge, and a distal edge, wherein the display panel is attached to the bag and positioned at the top of the computer equipment storage area and oriented to pivot the display panel into and out of the computer equipment storage area; and
   d. a cover pivotally attached to the bag front wall and positioned at the bottom of the computer equipment storage area wherein the cover is oriented to pivot from a storage position covering the computer equipment storage area to an operating position exposing the computer equipment storage area.

2. The portable computing apparatus of claim 1, further comprising at least one input/output tool on the display panel.

3. The portable computing apparatus of claim 1, further comprising a manual control on the display panel.

4. The portable computing apparatus of claim 3, wherein the manual control comprises one or more pointing devices on the back side of the display panel.

5. The portable computing apparatus of claim 4, further comprising tactile finger guides on the back side to guide an operator's fingers to positions on the pointing device.

6. The portable computing apparatus of claim 1, further comprising an electrical connection, the electrical connection configured to electrically connect the display panel to electrical equipment located inside the bag.

7. The portable computing apparatus of claim 1, further comprising one or more electrical access openings through the front wall located to pass electrical wiring from computer equipment mounted on the outside of the bag through the front wall to an interior of the bag.

8. The portable computing apparatus of claim 1, wherein the display panel is removably attached to the bag.

9. The portable computing apparatus of claim 8, wherein the display panel is removably attached to the bag with a top bag position pivoting computer equipment mount attached to the bag and matching an attachment attached to the display panel.

10. The portable computing apparatus of claim 9, wherein the top bag position pivoting computer equipment mount includes one or more attachment flaps.

11. The portable computing apparatus of claim 8, further comprising a body panel pivotally attached to the display panel and the bag is further comprised of an opening in the front wall wherein the body panel is attached to the inside surface of the bag front wall and the display panel passes through the opening so that the display panel is positioned at the top of the computer equipment storage area and oriented to pivot the display panel into and out of the computer equipment storage area.

12. The portable computing apparatus of claim 8, wherein the display panel is further comprised of a body panel pivotally attached to the display panel, the body panel configured to attach to the bag, wherein the display panel is positioned proximal to the top of the computer equipment storage area and pivotable so as to move the display panel into and out of the computer equipment storage area.

13. The portable computing apparatus of claim 8, wherein the display panel is removably attached to the bag using a support structure.

14. The portable computing apparatus of claim 1, further comprising a bottom bag position pivoting computer equipment mount attached to the bag and configured to attach computer equipment to the bag wherein the bottom bag position pivoting computer equipment mount is positioned on the bag front wall at or near the bottom of the computer equipment storage area and oriented to pivot computer equipment into and out of the computer equipment storage area.

15. The portable computing apparatus of claim 14, wherein the bottom bag position pivoting computer equipment mount includes one or more attachment flaps.

16. The portable computing apparatus of claim 14 further comprising an input device attached to the bottom bag position pivoting computer equipment mount.

17. The portable computing apparatus of claim 16, wherein the input device is further comprised of at least one input/output tool.

18. The portable computing apparatus of claim 16, wherein the input device is shaped to fit and cover the display panel stored in the computer equipment storage area.

19. The portable computing apparatus of claim 16, further comprising an electrical connection, the electrical connection configured to electrically connect the input device to electrical equipment located inside the bag.

20. The portable computing apparatus of claim 1, wherein the bag further comprises an input device attached to the cover.

21. The portable computing apparatus of claim 20, wherein the input device is removably attached to the cover.

22. The portable computing apparatus of claim 20, wherein the input device is further comprised of at least one input/output tool.

23. The portable computing apparatus of claim 20, wherein the input device is shaped to fit and cover the display panel.

24. The portable computing apparatus of claim 20, further comprising an electrical connection, the electrical connection configured to electrically connect the input device to electrical equipment located inside the bag.

25. The portable computing apparatus of claim 1, wherein a computing unit is contained in the display panel.

26. The portable computing apparatus of claim 1, further comprising a computing unit panel attached to the front wall of the bag.

27. The portable computing apparatus of claim 26, further comprising an electrical connection between the computing unit panel and the display panel.

28. The portable computing apparatus of claim 26, wherein the computing unit panel is attached to the inside of the front wall.

29. The portable computing apparatus of claim 28, further comprising a mounting structure on the inside of the bag front wall, the mounting structure configured to removably attach the computing unit panel to the inside surface of the bag front wall.

30. The portable computing apparatus of claim 28, wherein the computing unit panel acts as a rigid support for the front wall of the bag and facilitates the storage of the display panel in the computer equipment storage area on the outside of the front wall of the bag.

31. The portable computing apparatus of claim 26, wherein the display panel is pivotally attached to the computing unit panel and the computing unit panel is attached to the outside of the front wall, wherein the display panel is positioned proximal to the top of the computer equipment storage area and oriented to pivot the display panel into and out of the computer equipment storage area.

32. The portable computing apparatus of claim 31, further comprising a support structure on the outside surface of the bag front wall configured to removably attach the computing unit panel to the outside of the bag front wall.

33. The portable computing apparatus of claim 26, further comprising one or more memory receptacles on the computing unit panel.

34. The portable computing apparatus of claim 33, further comprising one or more removable memories matching the memory receptacles.

35. The portable computing apparatus of claim 26, further comprising at least one sound outlet on the computing unit panel.

36. The portable computing apparatus of claim 1, further comprising a left side wall and a right side wall, each of the side walls having an inner surface and an outer surface, and at least one of the side walls including at least one pocket attached to the outer surface.

37. The portable computing apparatus of claim 36, further comprising at least one peripheral holder with a receptacle physically matching a peripheral, wherein the holder is configured to match the side pocket.

38. The portable computing apparatus of claim 1, further comprising a display panel prop extending between the bag and the display panel, the display panel prop holding the display panel in one or more angular positions relative to the bag front.

39. The portable computing apparatus of claim 1, further comprised of a display on the front side of the display panel, wherein the display is facing away from the bag front wall when in a storage position.

40. A portable computing apparatus comprising:
 a. a bag comprised of a front wall, an inside surface, and an outside surface;
 b. a computer equipment storage area, including a top and a bottom, on the outside of the bag's front wall;
 c. a display panel comprising a front side, a back side, an attachment edge, and a distal edge, wherein the display panel is attached to the bag and positioned at the top of the computer equipment storage area and oriented to pivot the display panel into and out of the computer equipment storage area; and
 d. a bottom bag position pivoting computer equipment mount attached to the bag and configured to attach computer equipment to the bag wherein the bottom bag position pivoting computer equipment mount is positioned on the bag front wall at the bottom of the computer equipment storage area and oriented to pivot computer equipment into and out of the computer equipment storage area.

41. The portable computing apparatus of claim 40, further comprising at least one input/output tool on the display panel.

42. The portable computing apparatus of claim 40, further comprising a manual control on the display panel.

43. The portable computing apparatus of claim 42, wherein the manual control comprises one or more pointing devices on the back side of the display panel.

44. The portable computing apparatus of claim 43, further comprising tactile finger guides on the back side to guide an operator's fingers to positions on the pointing device.

45. The portable computing apparatus of claim 40, further comprising an electrical connection, the electrical connection configured to electrically connect the display panel to electrical equipment located inside the bag.

46. The portable computing apparatus of claim 40, further comprising one or more electrical access openings through the front wall located to pass electrical wiring from computer equipment mounted on the outside of the bag through the front wall to an interior of the bag.

47. The portable computing apparatus of claim 40, wherein the display panel is removably attached to the bag.

48. The portable computing apparatus of claim 47, wherein the display panel is removably attached to the bag with a top bag position pivoting computer equipment mount attached to the bag and matching an attachment attached to the display panel.

49. The portable computing apparatus of claim 48, wherein the top bag position pivoting computer equipment mount includes one or more attachment flaps.

50. The portable computing apparatus of claim 47, further comprising a body panel pivotally attached to the display panel and the bag is further comprised of an opening in the front wall wherein the body panel is attached to the inside surface of the bag front wall and the display panel passes through the opening so that the display panel is positioned at the top of the computer equipment storage area and oriented to pivot the display panel into and out of the computer equipment storage area.

51. The portable computing apparatus of claim 47, wherein the display panel is further comprised of a body panel pivotally attached to the display panel, the body panel configured to attach to the bag, wherein the display panel is positioned proximal to the top of the computer equipment storage area and pivotable so as to move the display panel into and out of the computer equipment storage area.

52. The portable computing apparatus of claim 47, wherein the display panel is removably attached to the bag using a support structure.

53. The portable computing apparatus of claim 40, wherein the bag further comprises an input device attached to the bottom bag position pivoting computer equipment mount.

54. The portable computing apparatus of claim 53, wherein the input device is removably attached to the bottom bag position pivoting computer equipment mount.

55. The portable computing apparatus of claim 53, wherein the input device is further comprised of at least one input/output tool.

56. The portable computing apparatus of claim 53, wherein the input device is shaped to fit and cover the display panel.

57. The portable computing apparatus of claim 53, further comprising an electrical connection, the electrical connection configured to electrically connect the input device to electrical equipment located inside the bag.

58. The portable computing apparatus of claim 40, wherein a computing unit is contained in the display panel.

59. The portable computing apparatus of claim 40, further comprising a computing unit panel, the computing unit panel attached to the front wall of the bag.

60. The portable computing apparatus of claim 59, further comprising an electrical connection between the computing unit panel and the display panel.

61. The portable computing apparatus of claim 59, wherein the computing unit panel is attached to the inside of the front wall.

62. The portable computing apparatus of claim 61, further comprising a mounting structure on the inside surface of the bag front wall configured to removably attach the computing unit to the inside of the bag front wall.

63. The portable computing apparatus of claim 61, wherein the computing unit panel acts as a rigid support for the front wall of the bag and facilitates the storage of the display panel in the computer equipment storage area on the outside of the front wall of the bag.

64. The portable computing apparatus of claim 59, wherein the display panel is pivotally attached to the computing unit panel and the computing unit panel is attached to the outside of the front wall, wherein the display panel is positioned proximal to the top of the computer equipment storage area and oriented to pivot the display panel into and out of the computer equipment storage area.

65. The portable computing apparatus of claim 64, further comprising a support structure on the outside of the bag front wall configured to removably attach the computing unit panel to the outside of the bag front wall.

66. The portable computing apparatus of claim 59, further comprising one or more memory receptacles on the computing unit panel.

67. The portable computing apparatus of claim 66, further comprising one or more removable memories matching the memory receptacles.

68. The portable computing apparatus of claim 59, further comprising at least one sound outlet on the computing unit panel.

69. The portable computing apparatus of claim 40, further comprising a left side wall and a right side wall, each of the side walls having an inner surface and an outer surface, and at least one of the side walls including at least one pocket attached to the outer surface.

70. The portable computing apparatus of claim 69, further comprising at least one peripheral holder with a receptacle physically matching a peripheral, wherein the holder is configured to match the side pocket.

71. The portable computing apparatus of claim 40, further comprising a display panel prop extending between the bag and the display panel, the display panel prop holding the display panel in one or more angular positions relative to the bag front.

72. The portable computing apparatus of claim 40, further comprised of a display on the front side of the display panel, wherein the display is facing away from the bag front wall when in a storage position.

73. The portable computing apparatus of claim 40, wherein the bottom bag position pivoting computer equipment mount includes one or more attachment flaps.

* * * * *